US012634566B2

(12) United States Patent
Żurowski et al.

(10) Patent No.: US 12,634,566 B2
(45) Date of Patent: May 19, 2026

(54) CAMERA WITH CARRIER ASSEMBLY HAVING DUAL-SIDED SPACERS FOR ENHANCED MECHANICAL STABILIZATION AND METHOD FOR MANUFACTURING SAME

(71) Applicant: Aptiv Technologies AG, Schaffhausen (CH)

(72) Inventors: Mirosław J Żurowski, Cracow (PL); Paweł Hebda, Cracow (PL); Maciej Krzanowski, Cracow (PL); Rafał Ochała, Jedlicze (PL); Witold Poreda, Ruciane Nida (PL)

(73) Assignee: Aptiv Technologies AG, Schaffhausen (CH)

( * ) Notice: Subject to any disclaimer, the term of this patent is extended or adjusted under 35 U.S.C. 154(b) by 146 days.

(21) Appl. No.: 18/491,757

(22) Filed: Oct. 21, 2023

(65) Prior Publication Data

US 2024/0137630 A1     Apr. 25, 2024
US 2024/0236454 A9     Jul. 11, 2024

(30) Foreign Application Priority Data

Oct. 21, 2022     (EP) ..................................... 22202979

(51) Int. Cl.
*H04N 23/54*          (2023.01)
*H04N 23/51*          (2023.01)
*H04N 23/52*          (2023.01)
(52) U.S. Cl.
CPC ............. *H04N 23/54* (2023.01); *H04N 23/51* (2023.01); *H04N 23/52* (2023.01)

(58) Field of Classification Search
CPC ........ H04N 23/54; H04N 23/51; H04N 23/52; H04N 23/55; G03B 21/16; G03B 30/00; G03B 2217/002; G03B 17/02; G03B 17/12
See application file for complete search history.

(56) References Cited

U.S. PATENT DOCUMENTS

| 10,179,550 | B1 | 1/2019 | Ectors | |
| 2016/0318456 | A1* | 11/2016 | Moenig | G06V 10/147 |
| 2017/0155808 | A1* | 6/2017 | Seger | H04N 23/54 |
| 2017/0280558 | A1* | 9/2017 | Ohara | G03B 17/02 |
| 2019/0302576 | A1* | 10/2019 | Rafalowski | B60S 1/026 |
| 2020/0195822 | A1 | 6/2020 | Agawa et al. | |
| 2023/0008374 | A1* | 1/2023 | Owaki | G03B 30/00 |

FOREIGN PATENT DOCUMENTS

| JP | 5413231 B2 | 8/2011 | |
| WO | WO-2021125074 A1 * | 6/2021 | G03B 17/02 |

OTHER PUBLICATIONS

Extended European Search Report for EP Application No. 22202979.5 dated Apr. 12, 2023, 7 pages.

* cited by examiner

*Primary Examiner* — Padma Haliyur
(74) *Attorney, Agent, or Firm* — Miller Johnson

(57) ABSTRACT

A camera includes an objective carrier assembly including a carrier where a camera sensor and a camera objective are mounted. The camera includes a camera housing configured to at least partially enclose the objective carrier assembly. The camera housing includes a first housing part where the objective carrier assembly is mounted. The camera housing includes a second housing part that is mounted on the first housing part.

14 Claims, 16 Drawing Sheets

CAMERA WITH CARRIER ASSEMBLY HAVING DUAL-SIDED SPACERS FOR ENHANCED MECHANICAL STABILIZATION AND METHOD FOR MANUFACTURING SAME

CROSS-REFERENCE TO RELATED APPLICATIONS

This application claims priority to EP App. No. 22 202 979 filed Oct. 21, 2022, the entire disclosure of which is incorporated by reference.

FIELD

The present disclosure relates to a camera and a method for manufacturing a camera, and more particularly to a secured and cleaner carrier for the device.

BACKGROUND

Automotive cameras have to fulfill increasingly high specifications as regards cleanliness and precision of the optical setup in order to function properly and reliably. More specifically, automotive cameras usually require an accuracy of alignment of a camera sensor in relation to mounting features at the camera and, thus, in relation to reference points at a car of +/−1 degree for a pitch, a yaw and a roll angle, respectively.

In the prior art, methods for manufacturing cameras are known where, in a first step, a printed circuit board is mounted to a front part of a camera housing and, in a following step, a camera objective has to be aligned with respect to a camera sensor on the printed circuit board and the camera housing. This method requires to keep the cleanliness of all components on high level. Furthermore, these methods have restrictions with regard to the placement of, e.g., screws, as well as to the use of other joining methods as, e.g., hot staking and riveting. In order to achieve these high cleanliness levels, the complete value stream of all involved components must be maintained at all times which generates process risks and high costs. Also, further process steps during an assembly lead to extended process times.

It is also known in the prior art to align a camera objective with respect to a carrier, typically a printed circuit board, based on housing features of the camera objective. A camera objective can, e.g., have a housing which has a circular cylinder shape at its front and a rectangular or square shape at its back side, which contacts the printed circuit board. An alignment can then take place based on, e.g., the edges of the rectangular or square shape. Typically, a cylindrical portion of the housing is used for gripping purposes. The manufacturing of such a housing with a high accuracy is expensive because only the front part of the housing can be lathed. The back must be made using CNC equipment.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Prior methods for manufacturing a camera are not able to provide alignment an accuracy of the camera sensor in relation to mounting features at the camera below +/−1 degree for a pitch, a yaw, and a roll angle, respectively.

Higher cleanliness requirement has increasingly to be fulfilled for applications where the imaging information provided by the camera is to be used for augmented reality applications, which are increasingly being used in cars. The accuracy of the roll angle is particularly critical since misalignments with respect to the roll angle cannot be easily compensated by vision algorithms.

It can therefore be considered an objective of the present invention to provide methods for manufacturing a camera and cameras which fulfill raised specification as regards cleanliness and precision of the optical setup. A further objective is to achieve improvements as to process safety, process time, and process costs.

These objectives are solved in a first to a seventh aspect of the invention, and more specifically, by the camera having the features of claim 1 and the method of manufacturing a camera having the features of claim 12.

Embodiments of the method for manufacturing an objective carrier assembly, the objective carrier assembly for a camera, the methods for manufacturing a camera, and the cameras according to the invention will be described in the following, in particular with respect to the depended claims and the figures.

According to the first aspect of the invention, a method for manufacturing an objective carrier assembly comprises the following steps: mounting a camera objective comprising at least one lens and an objective housing on a carrier comprising at least one camera sensor, wherein a contamination proof space is formed between the carrier and the objective housing, wherein boundaries of the contamination proof space are at least partially formed by portions of the carrier, the objective housing, and at least one optical component of the camera objective, and wherein the camera sensor is enclosed in the contamination proof space.

According to the second aspect of the invention, an objective carrier assembly for a camera comprises a carrier carrying at least one camera sensor and a camera objective which has an objective housing and at least one lens and which is mounted on the carrier over the at least one camera sensor, wherein a contamination proof space is formed between the carrier and the objective housing, wherein boundaries of the contamination proof space are at least partially formed by portions of the carrier, the objective housing, and at least one optical component of the camera objective, and wherein the at least one camera sensor is enclosed in the contamination proof space.

According to the third aspect of the invention, a method for manufacturing a camera comprises the steps of manufacturing an objective carrier assembly according to the method according to the invention and mounting of the objective carrier assembly into a camera housing.

According to the fourth aspect of the invention, a camera comprises an objective carrier assembly according to the invention and a camera housing in which the objective carrier assembly is, at least partly, received.

The camera according to claim 1 (fifth aspect of the present invention) comprises an objective carrier assembly having a carrier on which at least one camera sensor and a camera objective are mounted, and a camera housing configured to at least partially enclose the objective carrier assembly, the camera housing comprising a first housing part over which the objective carrier assembly is mounted and a second housing part which is mounted on the first housing part.

The method for manufacturing a camera according to claim 12 (sixth aspect of the present invention) comprises the steps of mounting an objective carrier assembly comprising a carrier on which at least one camera sensor and a camera objective are mounted over or on a first housing part of a camera housing and mounting of a second housing part of the camera housing on the first housing part.

According to the seventh aspect of the invention, a method for manufacturing a camera comprises manufacturing a camera having a camera housing and an objective carrier assembly having a carrier on which a camera objective and at least one camera sensor are mounted, the method comprising: aligning the objective carrier assembly in relation to a first housing part of the camera housing, mounting the objective carrier assembly over or on the first housing part in an aligned position, and mounting a second housing part on the first housing part.

The term objective carrier assembly is used in the present application for an assembly which comprises as essential components a carrier on which a camera sensor and a camera objective are mounted.

The term camera sensor means a two-dimensionally spatially resolving detecting device for electromagnetic radiation in the visible range and/or adjacent spectral regions. It is possible, e.g., in addition or alternatively to a camera sensor for the visible range, to have a camera sensor for the infrared range. Usually, pixelated semiconductor devices as, e.g., CMOS-, CCD, SPAD-sensors can be used. In such sensors the pixels can typically be arranged in a, e.g., rectangular or hexagonal grid. The camera sensor can, e.g., be a 1,3 MPixel sensor.

The term carrier refers to a device which is configured to mechanically hold at least the camera sensor and the camera objective in a specified spatial relation to each other. The term camera objective is referred to an assembly of optical components which is configured for imaging a viewed region on a camera sensor. A camera objective comprises at least one lens and a camera housing in which the lens is arranged. The optical components are at least partially received in the camera objective housing. The term optical components denotes components which manipulate the direction, the spectral composition, and/or the intensity of the electromagnetic radiation, e.g., light, by at least one of the physical effects of refraction, absorption, diffraction, and reflection. The optical components can thus comprise at least one of: lenses, filters, diffracting devices, holographic devices, mirrors. The term camera objective is also known as or can also be termed a lens module configured to be positioned on top of an imaging sensor.

The camera housing is a device in which at least portions of the objective carrier assembly are received. As will be described in more detail below, the camera housing can comprise a plurality of housing parts.

At least the carrier, the camera objective housing, and the camera housing have to fulfill the relevant specifications concerning mechanical and temperature stability.

The term contamination proof space means a space which is to some degree shielded against the entry of contamination particles as, e.g., dust or soot particles. As will be described below, the shielding does not necessarily have to be configured such that no particles can enter or leave the contamination proof space at all. It is sufficient if, e.g., the entry of particles which a larger than a specified size into the contamination proof space is prevented.

The contamination proof space is formed between the carrier and the objective housing, which means that the boundaries of the contamination proof space are essentially, but not necessarily entirely, formed by portions of the carrier, the objective housing, and at least one optical component, e.g., a lens of the camera objective. According to an important idea of the invention, the at least one camera sensor is enclosed in the contamination proof space.

The term mounting generally denotes a process where at least two components are mechanically connected to each other in such a way that these components are arranged in a spatially specified and mechanically sufficiently stable relation to each other. This applies, as described in more detail below, for the mounting of the camera sensor and a camera objective on the carrier, the mounting of the objective carrier assembly into a camera housing, and, more specifically, for the mounting of the objective carrier assembly over or on the first housing part, and the mounting of the second housing part on the first housing part.

The term aligning generally denotes a process where at least two components are brought into a specified spatial relation to each other.

An aligning step is usually part of a mounting step and is carried prior to fixing, e.g., by gluing, an aligned spatial relation of the at least two components with respect to each other. The aligned spatial relation should correspond to a specified predefined spatial relation. This applies, as described in more detail below, for the aligning of the camera objective in relation to the camera sensor and for the aligning of the objective carrier assembly in relation to a first housing part of the camera housing.

It can be considered to be one essential idea of the first invention described herein to mount a camera objective in a first step on a carrier instead of mounting it with respect to a part of the camera housing. Only in a second step will the objective carrier assembly and, thus, the camera objective then be mounted in a camera housing.

A further important idea of the invention is to create a contamination proof space by mounting the camera objective on the carrier over the camera sensor.

According to a further essential idea of the invention the objective carrier assembly is aligned with respect to first housing part prior to fixing a mounting position. In this regard the invention provides solutions which enable a dependable alignment with respect to the pitch, yaw, and roll angles.

As will be described hereinbelow, the mounting of the camera objective on the carrier can in particular be carried out in such a way that a camera objective is individually aligned to an individual carrier on which a camera sensor is mounted.

According to an essential idea of a various embodiment the aligning of the objective carrier assembly with respect to the camera housing is based on references which relate to a specific orientation of an individual camera sensor on the carrier.

A first important advantage of the present invention is that the surface for which high cleanliness specifications apply, i.e., the interior surface of the contamination proof space, is significantly reduced as compared to prior art solutions. A corresponding advantage is that the number of parts for which high cleanliness specifications apply is considerably smaller as with prior art solutions. Furthermore, the number of process steps and thus process time can be reduced.

A further important advantage of the present invention is that an expected particle size of contaminations in the contamination proof space can be reduced to around 50 micrometers which has to be compared with a particle size of approximately 200 micrometers which can be achieved with prior art solutions.

These factors enable an improved optical performance of the cameras according to the invention, both in regard of so-called Time Zero performance, i.e., the performance right after completing the manufacturing process, as well as in regard of the lifetime performance of the cameras. An improved lifetime cleanliness level is assured essentially through protecting the optical path by the ventilation membrane. This membrane does not allow particles to enter the optical path but at the same time equalizes pressures inside and outside of the camera.

A further important advantage is that only small mechanical stresses have to be applied to the carrier carrying the camera sensor, both in the manufacturing method according to the invention as well as in use, which also adds to the optical performance.

The method for manufacturing an objective carrier assembly enables an improved accuracy of the alignment of the camera objective with respect to the camera sensor as compared to prior art solutions. Furthermore, the invention allows an improved accuracy of the alignment of the objective carrier assembly and specifically of the camera sensor with respect to the camera housing and thus with respect to a place of installation. The low mechanical stresses contribute to this improved accuracy of aligning.

More specifically, the solutions described herein allow an aligning of the camera sensor with respect to each of the pitch, yaw, and roll angles below +/−1 degree in relation to geometrical features of the camera housing. An important advantage is also that this improved accuracy of alignment can be achieved independently of mechanical tolerances of, e.g., a housing of the camera objective. Rather, the accuracy of the alignment in particular with respect to the roll angle will be dependent only on how accurately the process is carried out. Below a robust process will be described for this alignment. Optionally, the present invention allows the alignment of the objective carrier assembly to be process controlled for each of the pitch, yaw, and roll angles. These options will be described below.

In the camera according to the fifth aspect of the invention and the methods for manufacturing a camera according to the sixth and seventh aspect of the present invention the objective carrier assembly can be manufactured according to the method of the first aspect of the invention and can be an objective carrier assembly according to the second aspect of the present invention.

The methods for manufacturing a camera according to the invention can generally be configured for manufacturing a camera according to the invention.

The objective housing can generally be made of a plastic. In a various embodiment of the objective carrier assembly, though, the objective housing is made from metal, in particular of brass, aluminum, or an alloy containing aluminum.

Generally, the objective housing can have any predefined outer shape. In a various implementation of the objective carrier assembly, the objective housing has a circular cylindrical shape.

In an advantageous embodiment of the objective carrier assembly the objective housing is made of at least one lathed piece. Thus, a high precision outer shape of the objective housing can be achieved.

The camera objective is oriented in such a way that its optical axis is oriented transversely, in particular perpendicularly, to an active surface of the camera sensor.

In an advantageous embodiment of the objective carrier assembly, the carrier has holding regions which are configured to interact during assembly with a grabbing tool to enable a well-defined grabbing of the objective carrier assembly during an alignment of the objective carrier assembly in relation to the first camera housing.

In an advantageous embodiment of the objective carrier assembly, the carrier is a printed circuit board. Thus, the carrier can also carry electric, electronic, and other components, e.g., components serving mechanical purpose.

In a further advantageous embodiment of the objective carrier assembly, the carrier has a connector for establishing a connection to external devices, which connector is arranged on a side of the carrier which is opposed to a side where the camera objective is mounted.

The connector and the carrier can be configured so as to allow at least two geometrically different mountings of the connector on the carrier. The mounting of the camera objective on the printed circuit board takes place after all other components, in particular electric and electronic components, have been mounted on or connected to the printed circuit board. Thus, the accuracy of the mounting of the camera objective with respect to the camera sensor on the carrier will not be influenced by further process steps involving the carrier.

In a various implementation, the method for manufacturing an objective carrier assembly comprises a cleaning step, prior to the step of mounting the camera objective on the carrier. The cleaning step can comprise at least one of: removing of contamination particles by blowing of a cleaning gas over the carrier, wiping of the carrier at least in the vicinity of the at least one camera sensor, wiping of the surface of the camera sensor. Any inert gas, in particular Nitrogen, $CO_2$, Argon, or mixtures thereof, can be used as a cleaning gas.

In principle, the mounting of the camera objective on the carrier can comprise any mechanical connection technique which on the one hand provides a stable mechanical connection and on the other hand enables the formation of the contamination proof space.

In an advantageous embodiment of the method for manufacturing an objective carrier assembly, the step of mounting the camera objective on the carrier comprises mounting the objective housing on the carrier via an adhesive.

More specifically, the mounting of the objective housing on the carrier can be done by gluing. Advantageously, a light curable glue can be used as an adhesive. Light in this regard means electromagnetic radiation. E.g., a UV curable glue is used. Such glues are commercially available and their properties and handling are well-known.

E.g., the step of gluing the objective housing on the carrier can comprise applying the glue to at least one of a back rim of the objective housing and the carrier.

Advantageously, an orientation of the camera objective with respect to the carrier is fixed by snap-curing of the glue.

The orientation of the camera objective with respect to the carrier can then be finalized by curing of the glue in an oven. This is generally known in the art.

For the accuracy of the alignment between the camera objective and the camera sensor it is important that mechanical stresses on the components be as small as possible. Improvements in this regard can be achieved in a various implementation of the objective carrier assembly, wherein at least one of the carrier and the objective housing has at least one opening which allows a pressure equalization between an inside and an outside of the contamination proof space. Pressure equalization inhibits mechanical stresses caused by pressure differences between the inside and an outside of the contamination proof space. Furthermore, a pressure equalization has advantages for the manufacturing process since a formation of bubbles in a glue can be avoided.

Advantageously, the size and/or the position of the opening or openings are configured to prevent an entering of contamination particles into the contamination proof space.

In a particularly embodiment of the objective carrier assembly, a semipermeable cover is arranged over the opening. The semipermeable cover comprises a large number of small openings which enable, as desired, the pressure equalization but prevent the entering of contamination particles. E.g., the cover can comprise at least one of a semipermeable membrane and a semipermeable poriferous pad.

The opening is arranged in a marginal portion of the carrier which, when the objective carrier assembly is mounted in accordance with its intended use, is an upper portion with respect to the direction of gravitation, i.e., with respect to a nominal vertical axis. An accumulation of contamination particles in the neighborhood of the opening and, thus, a clogging of the pores of the semipermeable cover is then less likely.

Advantageously, the step of mounting the camera objective on the carrier further comprises a step of aligning the camera objective in relation to the camera sensor in such a way that an optical axis of the camera objective is oriented transversely to an active surface of the camera sensor. Usually, the camera objective will be aligned in relation to the camera sensor in such a way that the optical axis of the camera objective is oriented perpendicularly to the active surface of the camera sensor. Other relative orientations between the camera objective and the camera sensor would be possible, though.

In an embodiment of the method for manufacturing a camera, the step of aligning the camera objective comprises holding at least one of the camera objective and the carrier with a robot arm and manipulating, by operation of the robot, an orientation between the camera objective and the carrier.

In a particular embodiment, the step of aligning the camera objective comprises using live measurement data of the camera sensor for finding an intended orientation between the camera objective and the carrier.

As pointed out before, the reduction of mechanical stresses on the carrier is crucial for the accuracy of the optical setup. In this regard, further improvements are possible in an advantageous embodiment of the camera where elastic spacers are arranged between the objective carrier assembly and at least one of the first housing part and the second housing part, the elastic spacers being configured to mechanically stabilize the objective carrier assembly within the camera housing.

Advantageously, the elastic spacers can have further functions. E.g., the elastic spacers can be further configured for providing at least one of an electrical shielding of the objective carrier assembly, an electrical contact to the objective carrier assembly, and an electrical ground contact to the objective carrier assembly.

In principle, the first housing part and the second housing part can be made of a plastic material. Since the camera normally operates at high frequencies which can be easily disturbed by external electromagnetic fields or the camera itself can influence external devices, though, at least portions of at least one of the first housing part and the second housing part is made of a metal, e.g., a die-cast metal, e.g., Aluminum. It is also possible that at least one of the first and the second housing part is entirely made of a metal. This way, the camera housing and the back cover can create a "Faraday-cage" and, thus, a good shielding which is recommended due to EMC reasons. The metallic portions of the housing part are useful for the purpose of heat dissipation.

Advantageously, portions of thermally conductive material can be arranged between portions of the carrier of the objective carrier assembly and portions of at least one of the first housing part and the second housing part. The thermally conductive material is configured to improve heat dissipation from the objective carrier assembly to at least one of the first housing part and the second housing part.

According to various implementations, the first housing part is configured for mounting the camera at a place of installation, e.g., at a vehicle. More specifically, the first housing part can have geometrical features which are configured for connecting or mounting the camera at a place of installation, e.g., a vehicle. These geometrical features are formed with the first housing part in one piece. Thus, no further sources of misalignment are introduced between a means for connecting the camera and, e.g., a car, and the first housing part.

In principle, the mounting of the objective carrier assembly over or on the first housing part can comprise any mechanical connection technique which on the one hand provides a stable mechanical connection and on the other hand enables a precise alignment without imposing mechanical stresses on the involved components. E.g., laser welding methods can be used. In one embodiment, though, the objective carrier assembly is mounted over or on the first housing part via an adhesive, in particular by gluing. More specifically, the step of mounting the objective carrier assembly over or on the first housing part can advantageously comprise gluing at least a housing of the camera objective to the first housing part.

As with the mounting of the camera objective on the carrier, a light curable glue or adhesive, in particular a glue curable by ultraviolet radiation, can be used for fixing the objective camera assembly, in particular the camera objective housing, over or on the first housing part. The glue might also be curable by heat or other methods. In order to influence an electrical performance, the glue might also contain electrically conductive ingredients.

In this regard, the step of mounting the objective carrier assembly over or on the first housing part can comprise fixing the orientation of the objective carrier assembly with respect to the first housing part by snap-curing of the light curable glue.

Advantageously, light for the curing of the light curable glue can be applied through openings in the camera housing. In this regard, the first housing part of the camera can advantageously have at least one opening or a plurality of openings which are configured to enable a snap-curing of a light curable glue. The orientation of the objective carrier assembly with respect to the first housing part can be finalized by curing of the glue in an oven.

A final mounting of the camera housing is done in such a way that the objective carrier assembly is not involved. This has the advantage that the mechanical stresses imposed on the objective carrier assembly can be minimized. In one embodiment, the mounting of the carrier objective assembly into the camera housing can, e.g., comprise mounting a second housing part of the camera housing, in particular a back cover, to the first housing part. This can be achieved by a suitable and reversable connection technique. In one embodiment, the second part of the camera housing can be mounted on or connected with the first housing part by screwing.

Advantageously, the step of mounting the objective carrier assembly over or on the first housing part can comprise a step of aligning the objective carrier assembly with respect to the first housing part. This aligning step can comprise aligning the objective carrier assembly with respect to geometrical alignment features of the first housing part. More particularly, the geometrical alignment features of the first housing part are also configured for mounting the camera at a place of installation.

The aligning step can comprise an aligning of the objective carrier assembly in relation to the first housing part at least with regard to a roll angle. Advantageously, though, the aligning step comprises aligning the objective carrier assembly in relation to the first housing part also with regard to at least one of a pitch angle and a yaw angle.

The aligning step can advantageously comprise manipulating an orientation of the objective carrier assembly in relation to the first housing part at least with regard to the roll angle using a robot which holds at least one of the objective carrier assembly and the first housing part. In a particular embodiment, the robot manipulates the orientation of the objective carrier assembly in relation to the first housing part also with regard to at least one of the pitch angle and the yaw angle. E.g., an arm of the robot can grab the carrier at the holding regions which have been described above.

In various implementations of the camera the first housing part has geometrical alignment features which are configured as reference markers for aligning of the carrier objective assembly in relation to the first housing part. More specifically, the geometrical alignment features can be configured to define a direction of a nominal optical axis, a nominal transversal direction, and a nominal vertical direction. The direction of the nominal optical axis can be perpendicular to both the nominal vertical direction as well as to the nominal transversal direction.

For these purposes, the geometrical alignment features can advantageously have an elongated, in particular cylindrical or cone-shaped, form and each of the geometrical alignment features can be characterized by an axis. E.g., the geometrical alignment features can be realized by at least two of elongated protrusions, in particular pins and elongated holes. The axes of the elongated protrusions or holes can be parallel.

The direction of the nominal optical axis can be defined to be the of the parallel axes of the elongated protrusions or holes; the direction of the nominal transversal direction can be defined to be the direction of the shortest distance between the axes of the elongated protrusions or holes; and the direction of the nominal vertical direction can be defined to be perpendicular to both the nominal optical as well the nominal transversal direction.

In a various implementation, the geometrical alignment features are further configured for mounting the camera at a place of installation, in particular at a vehicle. Thus, no misalignment can be introduced by a separate means for connecting the camera to, e.g., a car. The geometrical alignment features can, e.g., be realized by at least two mounting holes or two mounting pins.

Generally, the final result which is to be achieved is that the at least one camera sensor is mounted in an aligned position. This purpose is served in one embodiment of the camera, where the at least one camera sensor is in a predefined orientation with respect to the first housing part. The purpose is served furthermore in an embodiment where the objective carrier assembly is mounted in an aligned position, in particular in relation to the first housing part with respect to a pitch angle, a yaw angle, and a roll angle.

An optical axis of the camera objective can be aligned along a nominal optical axis, which can in particular be perpendicular to both the nominal transversal as well as the nominal vertical directions. A direction of extension of pixel lines of the camera sensor can be aligned along the nominal transversal direction. As described above, the camera objective is aligned such that its optical axis is oriented transversely, in particular, perpendicularly to an active surface of the camera sensor.

The carrier of the objective carrier assembly can have geometrical markers defining a reference direction in relation to the camera sensor and in particular in relation to the direction of the pixel lines of the camera sensor.

In one implementation of the method for manufacturing a camera, the aligning step comprises bringing into mechanical engagement corresponding abutments at the objective carrier assembly and the first housing part, respectively. For this purpose, the objective carrier assembly can have at least one mechanical abutment which is configured to engage a mechanical abutment provided at the first housing part and which is configured for the alignment of the objective carrier assembly in relation to the first housing part with respect to at least the pitch angle and the yaw angle.

The at least one abutment of the objective carrier assembly can, in principle, be at the carrier. In one embodiment, though, the at least one abutment is provided at the camera objective housing.

In an alternative embodiment, for which no mechanical abutments are necessary, the aligning step comprises obtaining information on the relative orientation between the objective carrier assembly and the camera housing by evaluating live image data from the camera sensor for finding an aligned position of the objective carrier assembly with respect to at least the pitch angle and the yaw angle in relation to the camera housing.

The aligning step can, e.g., comprise exposing the camera sensor to an image which is in a well-defined orientation with regard to the first housing part, in particular in a well-defined orientation to the geometrical alignment features of the first housing part, monitoring live image data from the camera sensor of the image, and using the live image data for aligning the objective camera assembly with respect to the pitch and the yaw angles.

After completion of the aligning step, an orientation of the objective carrier assembly with respect to the first housing part can be fixed by snap-curing of a light curable glue as described above.

Advantageously, the aligning step comprises aligning the objective carrier assembly in such a way with respect to the first housing part that the at least one camera sensor is in a predefined orientation with respect to the first housing part, in particular with respect to its geometrical alignment features.

In a particular embodiment, the aligning step comprises aligning an individual objective carrier assembly specifically with respect to the first housing part based on an orientation of the camera sensor with respect to the carrier in the individual objective carrier assembly and based on a predefined orientation of the camera sensor with respect to the first housing part. This serves the purpose of aligning of the at least one camera sensor with respect to the first housing part by aligning the objective carrier assembly.

In a particular embodiment of the camera, an individual objective carrier assembly is specifically aligned in relation to the first housing part based on an orientation of the camera sensor with respect to the carrier in the individual objective carrier assembly and based on a predefined orientation of the camera sensor with respect to the first housing part. I.e., the objective carrier assembly will be mounted over or on the first housing part in an orientation which has been individually and specifically determined for each individual camera.

In this regard, a particular embodiment comprises a step of measuring an orientation of the camera sensor in relation to the carrier, in particular with respect to a roll angle, wherein measurement results of the measuring step are used in the aligning step so as to bring the camera sensor in a predefined orientation to the first housing part.

In principle, it would be possible to use, e.g., features of a housing of the camera sensor as a reference for the alignment. Since what counts, though, is the orientation of the pixel lines, better results are achieved in an embodiment wherein the measuring step comprises measuring an orientation of the pixel lines of the camera sensor with respect to the carrier.

Advantageously, the measuring step comprises measuring the orientation of the camera sensor with respect to a reference direction which is defined by markers on the carrier. E.g., the markers can be formed by two points on the carrier and the reference direction can be defined by a line connecting these two points.

The measuring step can comprise saving of measurement results in a memory device. E.g., the carrier of an individual objective carrier assembly can have a memory tag where specific data of this individual objective carrier assembly is stored. In one embodiment, though, the measurement results for a specific carrier can be stored in a computer system, e.g., in a Factory Information System (FIS). Advantageously, the carrier of an individual objective carrier assembly can have a tag containing a reference to specific data of this individual objective carrier assembly which are stored in a computer system.

The specific data of an individual objective carrier assembly can comprise an orientation of the camera sensor with respect to the carrier of the objective carrier assembly.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
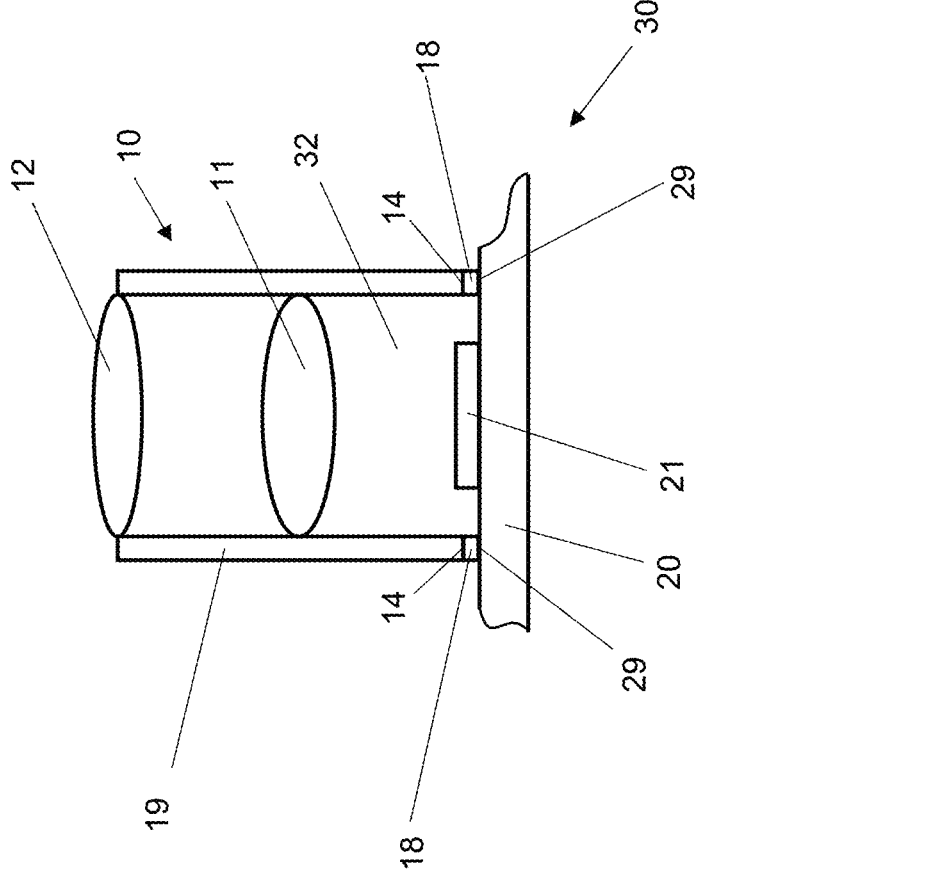
FIG. 1 shows a schematic partial sectional view of an objective carrier assembly according to the invention.

The objective carrier assembly 30 for a camera comprises a carrier 20 carrying at least one camera sensor 21 and a camera objective 10 which is mounted on the carrier 20 over the at least one camera sensor 21. The camera objective 10 comprises an objective housing 19 and, in the embodiment shown in FIG. 1, two lenses 11, 12. In real embodiments, the number of lenses can be higher.

According to essential ideas of the invention, the surface for which high cleanliness specifications have to be fulfilled, i.e., the interior surface of the contamination proof space 32, and, correspondingly, the number of parts for which these strict specifications apply, can be considerably smaller as with prior art solutions.

The FIGS. 2 to 12, 14 and 16 show different views of an embodiment of the invention. Variants of this embodiment will be described with reference to FIGS. 13 and 14.

Identical and equivalent components generally have the same reference numbers in each of the figures.

Figure 2:
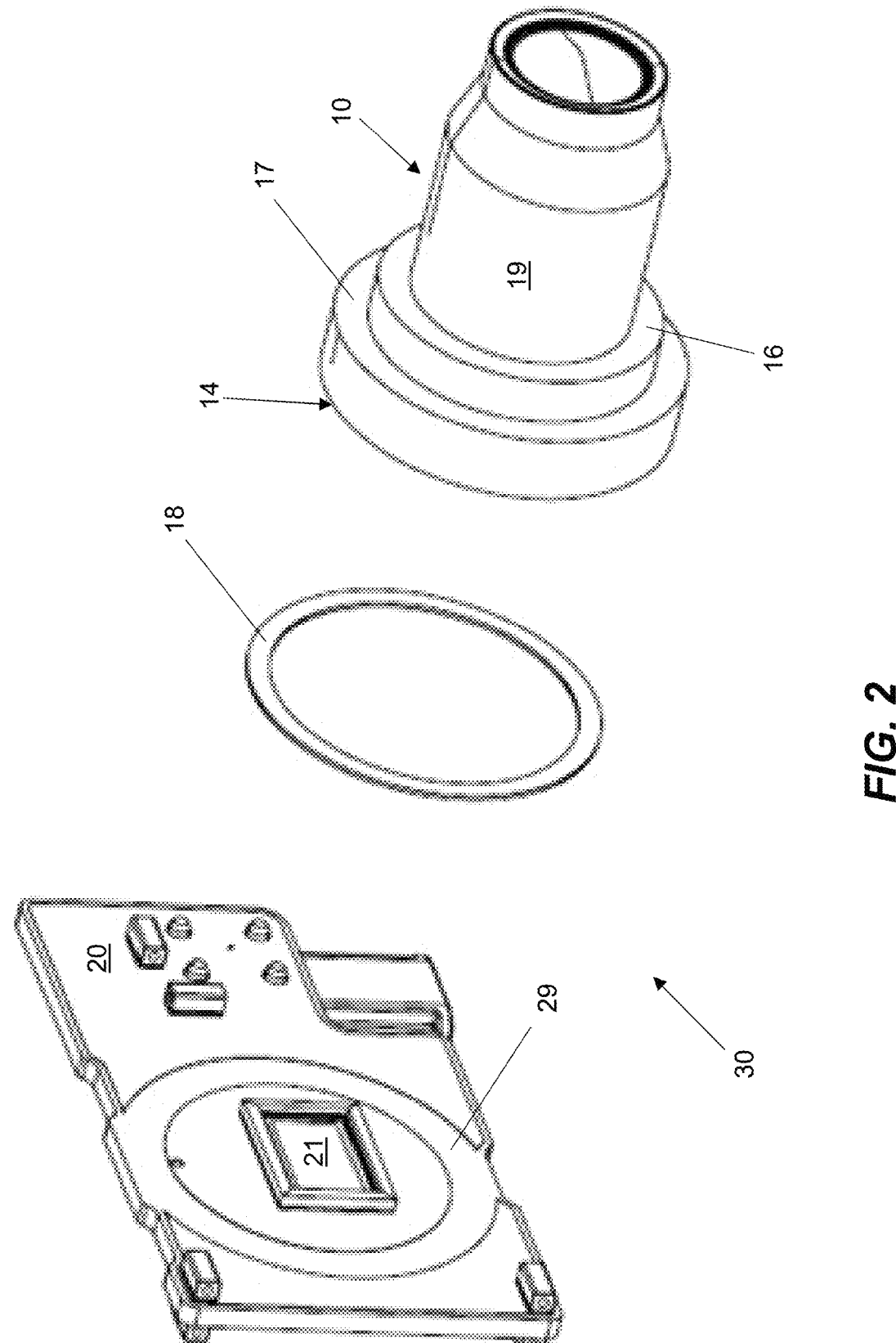
FIG. 2 shows an exploded view of an objective carrier assembly according to the invention.

FIG. 2 shows an exploded view of an embodiment of an objective carrier assembly 30 according to the invention. The essential components thereof are a carrier 20, a camera sensor 21, and a camera objective 10 having a camera housing 19. In the shown embodiment, the carrier is a printed circuit board 20. The camera sensor 21 which is mounted on the printed circuit board 20 can, e.g., be a 1.3 MPixel CMOS-Sensor. Further components on the printed circuit board 20 will be described below. The camera objective 10 comprises a plurality of lenses which are enclosed in the objective housing 19 which has a generally cylindrical shape. An optical axis of the camera objective 10 should be collinear with the axis of the cylindrical shape of the objective housing 19. The objective housing 19 comprises a lathed metal piece. Further features of the objective housing 19 such as ring-like steps 16 and 17 will be described further below.

Figure 3:
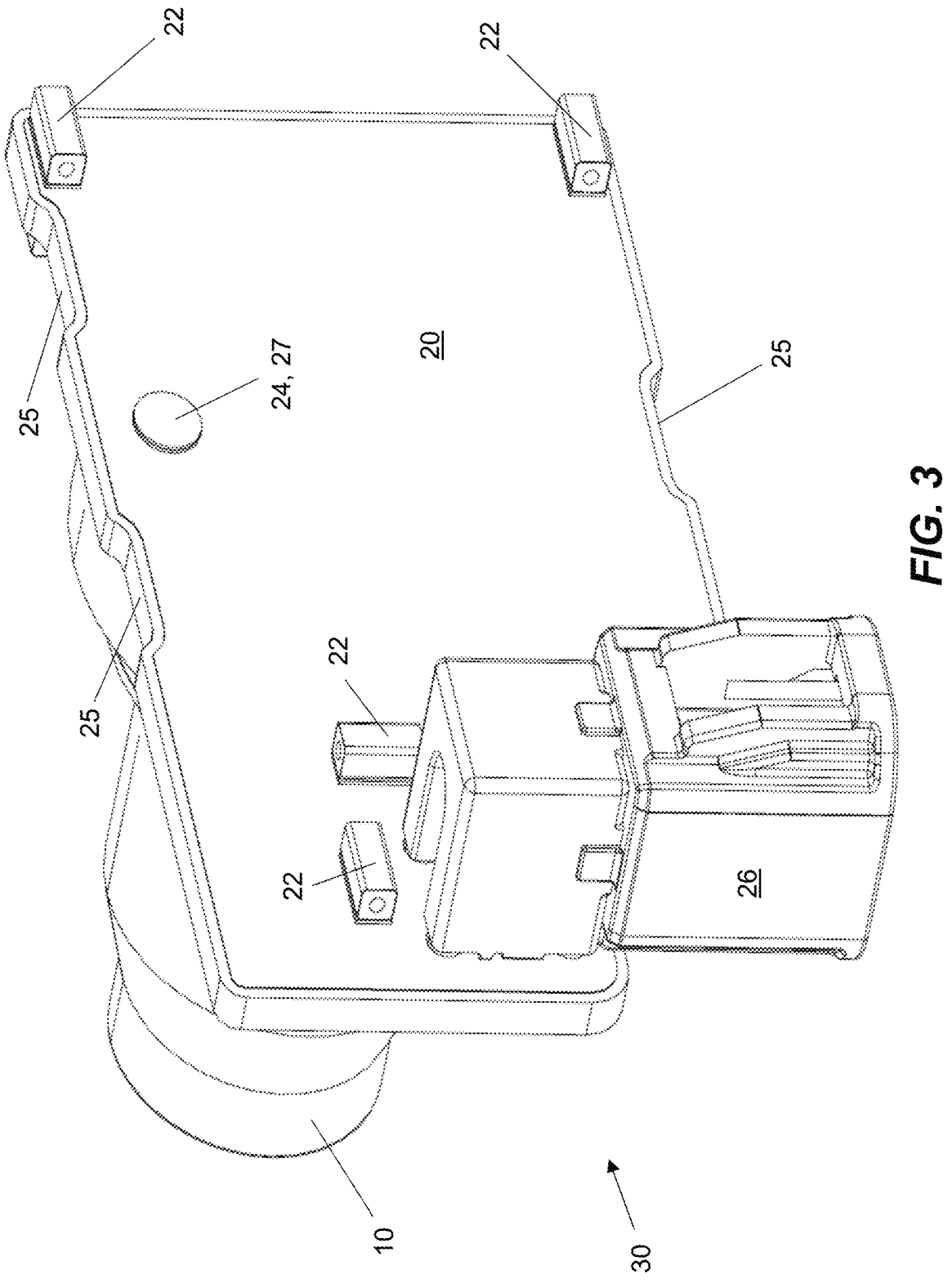
FIG. 3 shows a back-perspective view of the assembled objective carrier assembly of FIG. 2.
Figure 4:
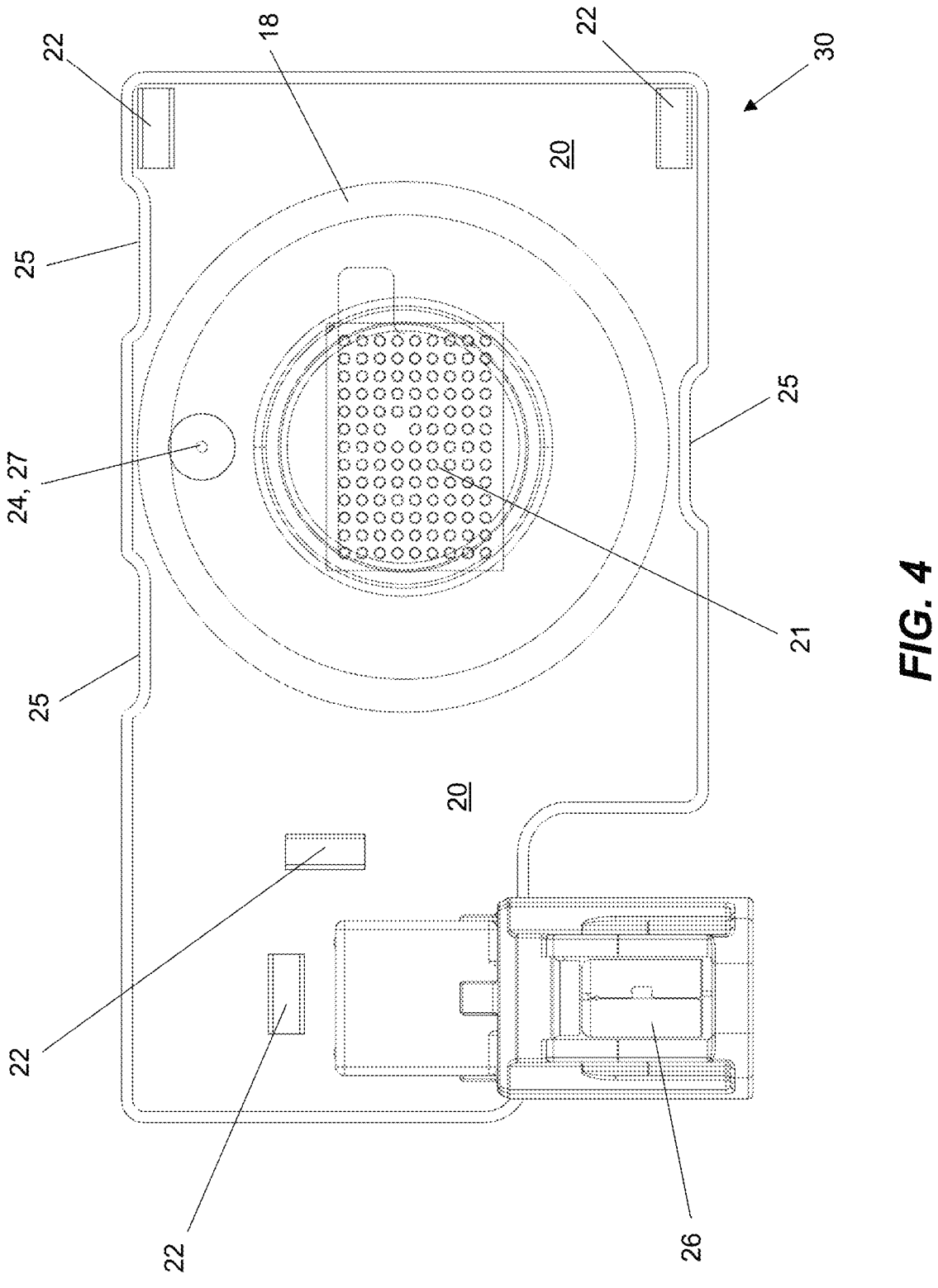
FIG. 4 shows a back and partially transparent view of the objective carrier assembly of FIG. 3.
Figure 5:
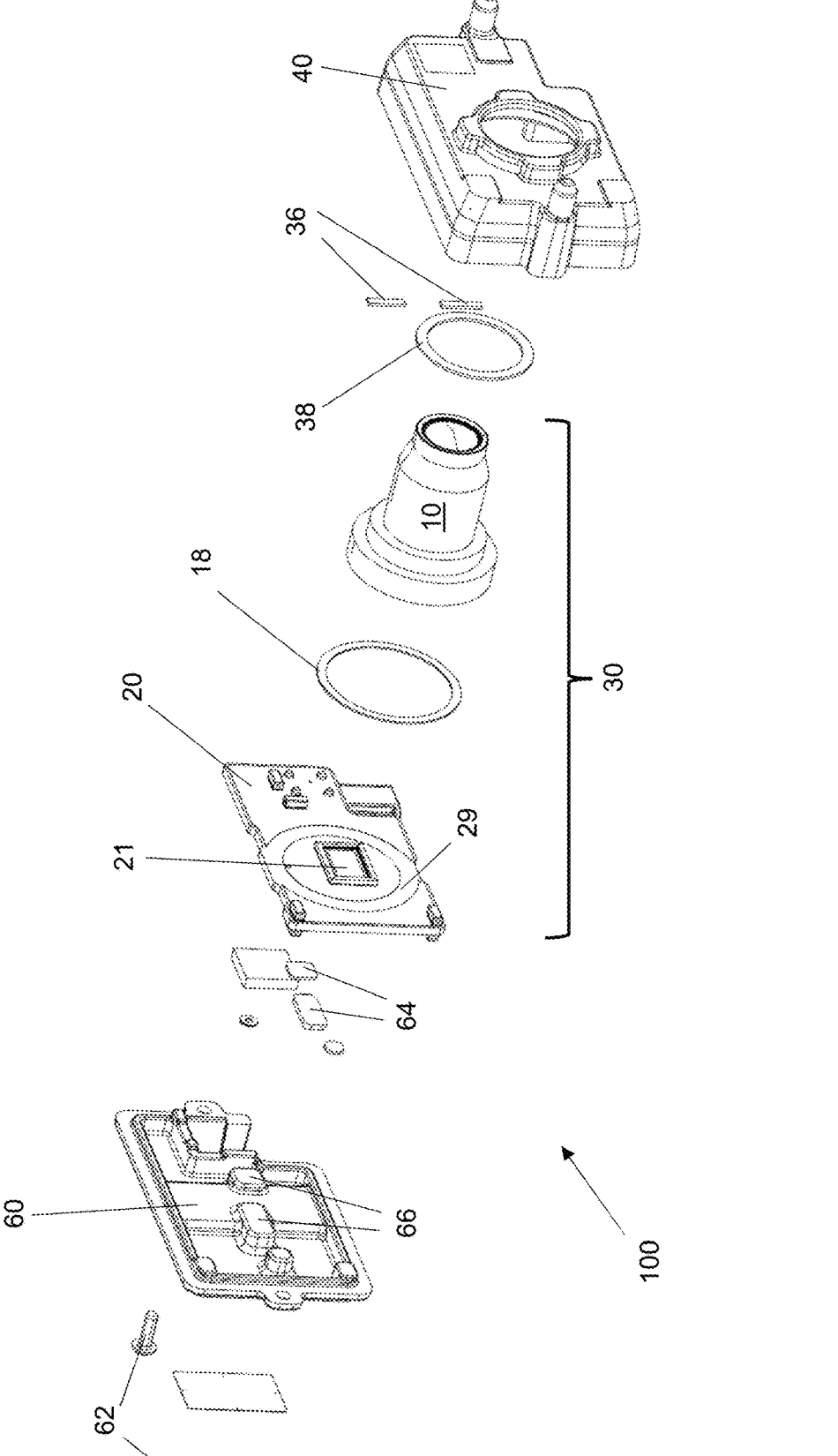
FIG. 5 shows a front perspective exploded view of a camera according to the invention comprising the objective carrier assembly of FIGS. 2 and 3.
Figure 6:
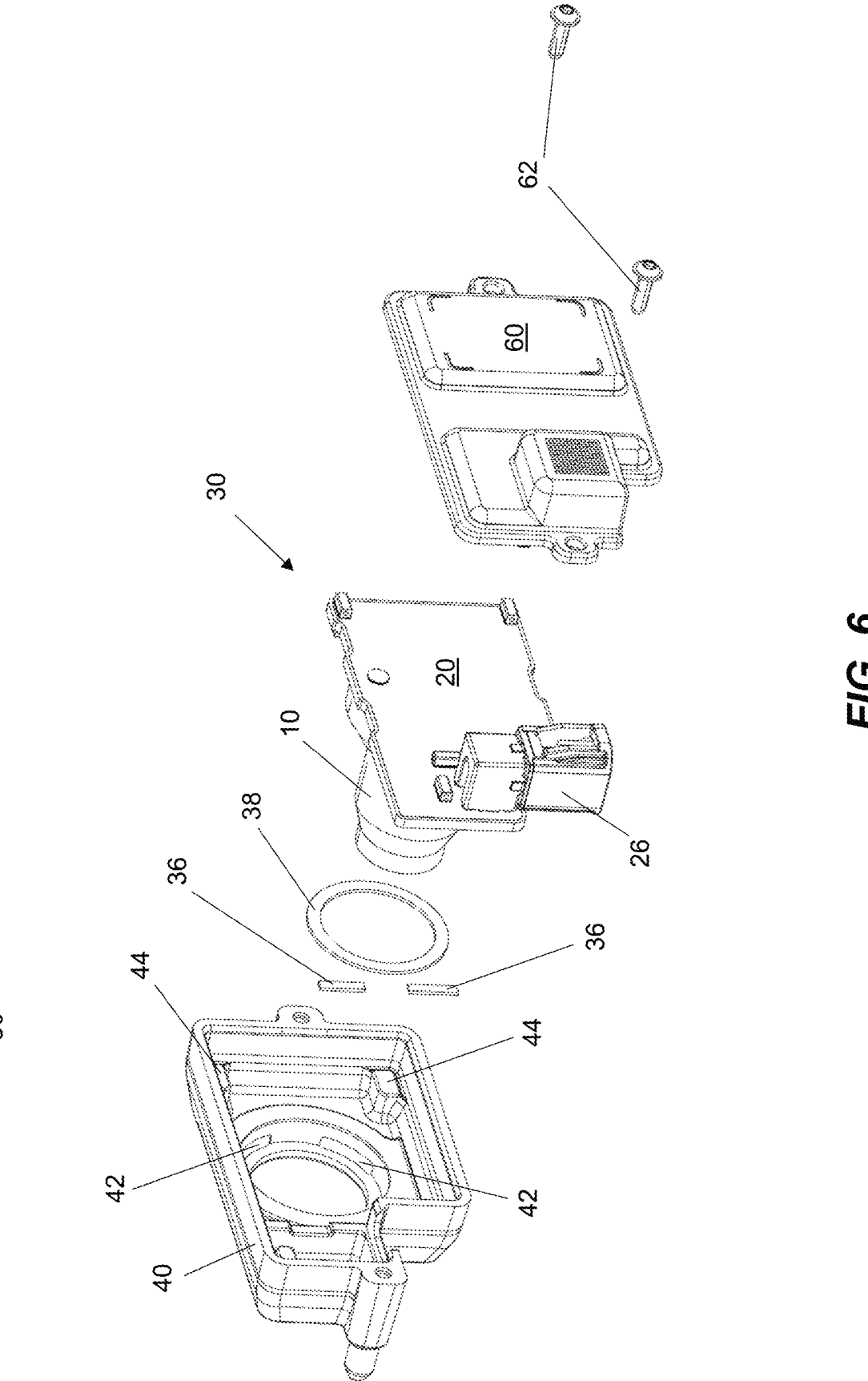
FIG. 6 shows a back perspective exploded view of the camera of FIG. 5.
Figure 7:
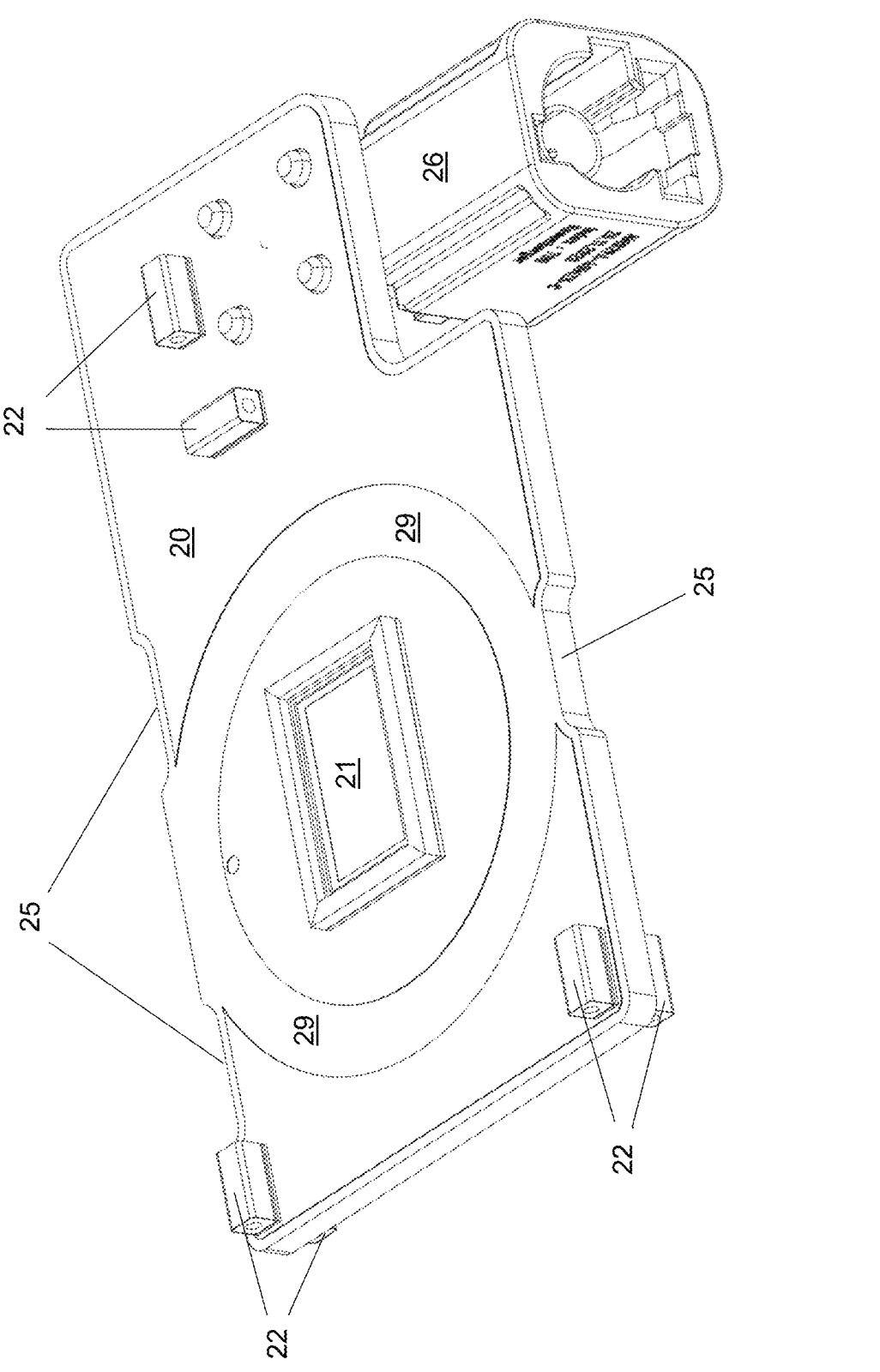
FIG. 7 shows a top perspective view of the carrier of the camera of FIGS. 5 and 6.
Figure 8:
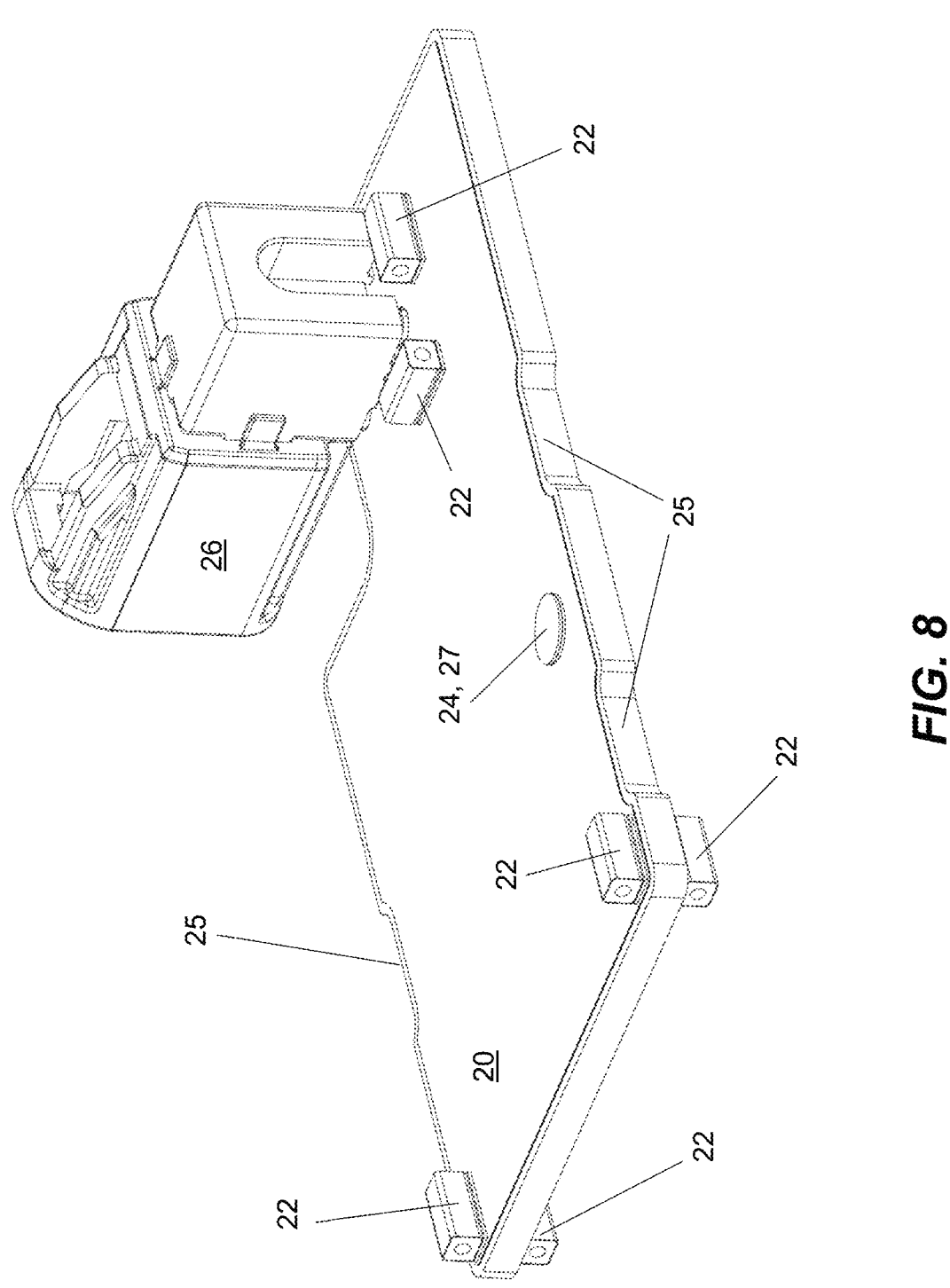
FIG. 8 shows a back-perspective view of the carrier of the camera of FIGS. 5 and 6.
Figure 9:
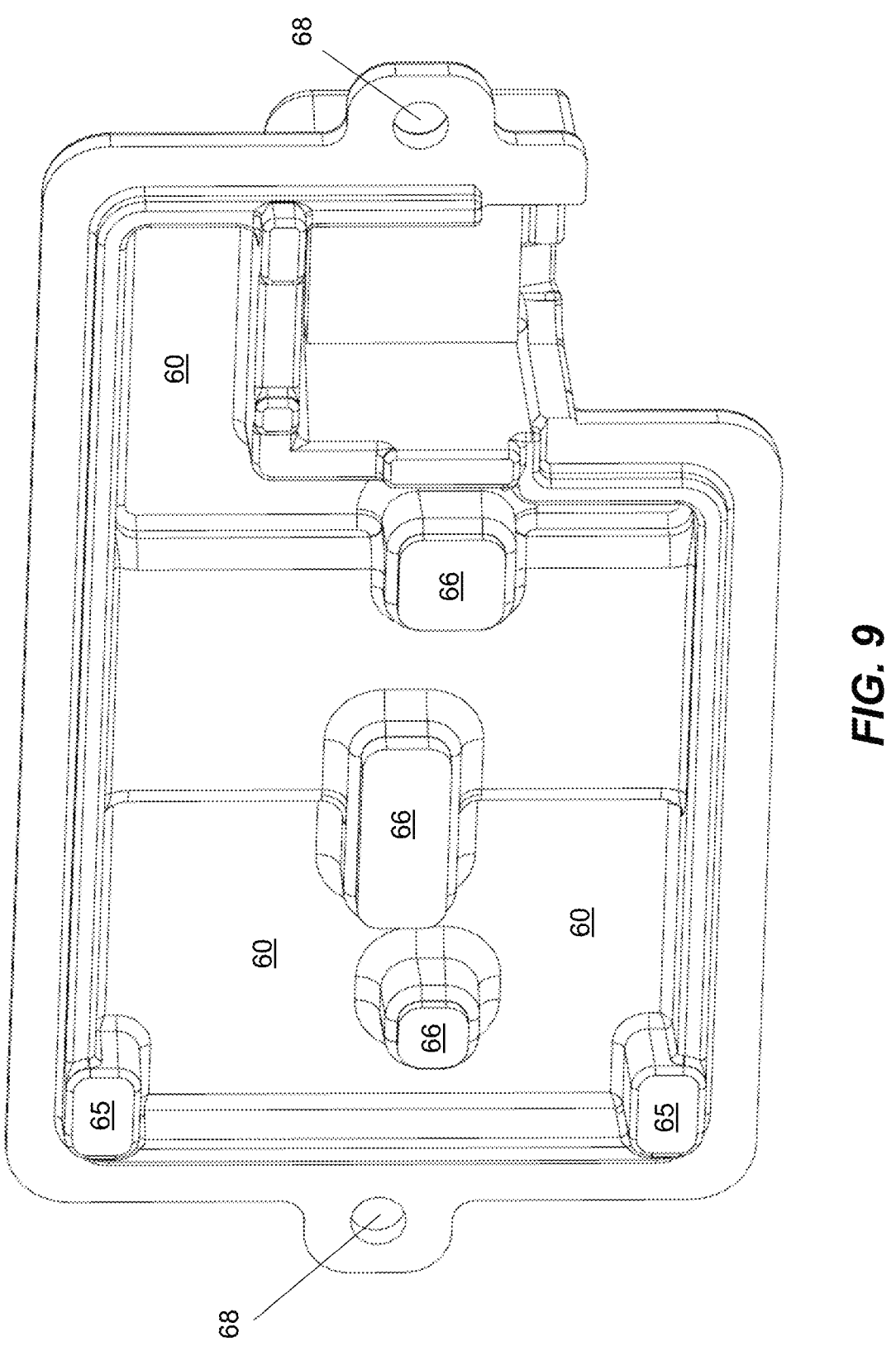
FIG. 9 shows an inner side of the second housing part of the camera of FIGS. 5 and 6.
Figure 10:
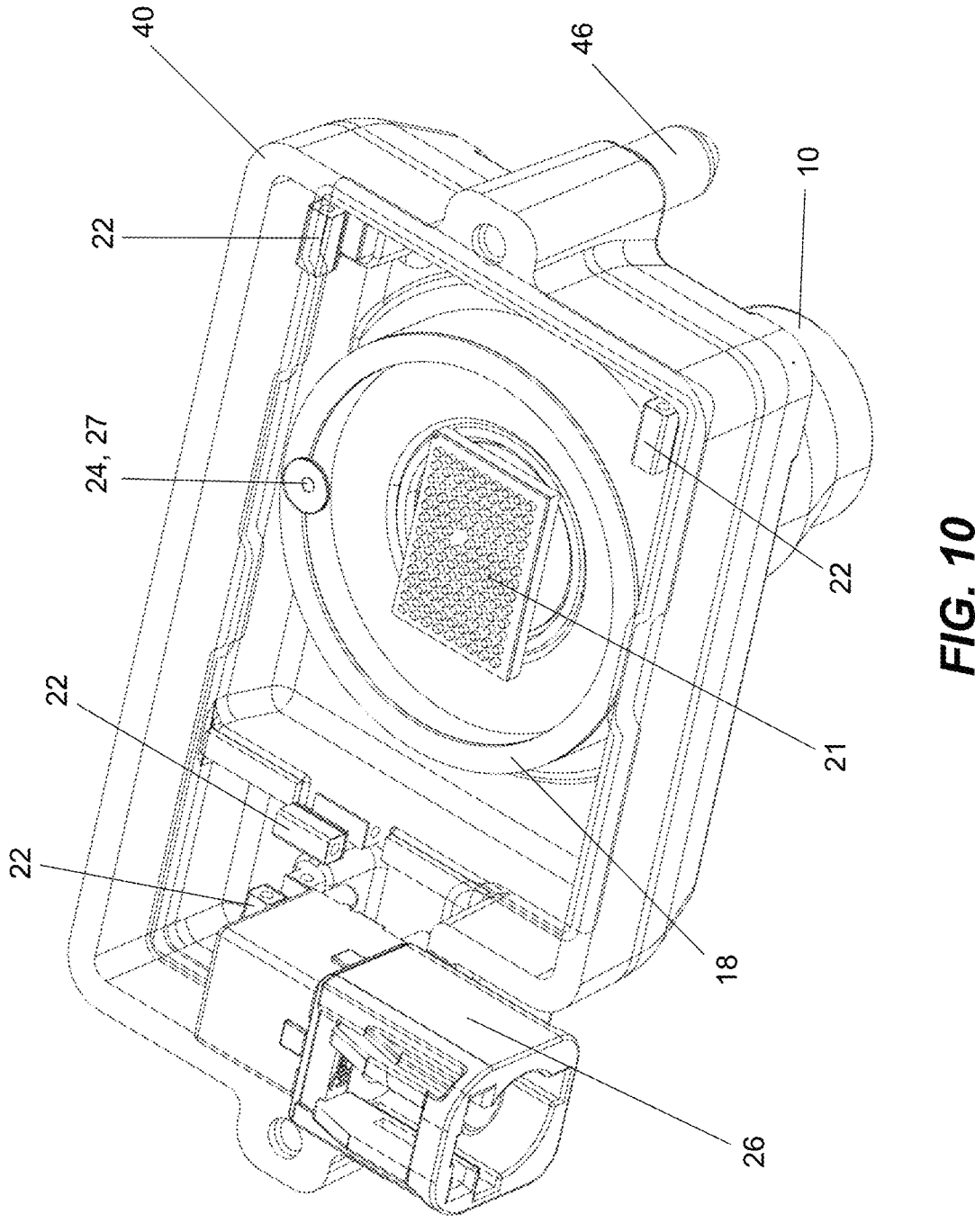
FIG. 10 shows a partially transparent inside view of the partially assembled camera of FIGS. 5 and 6.
Figure 11:
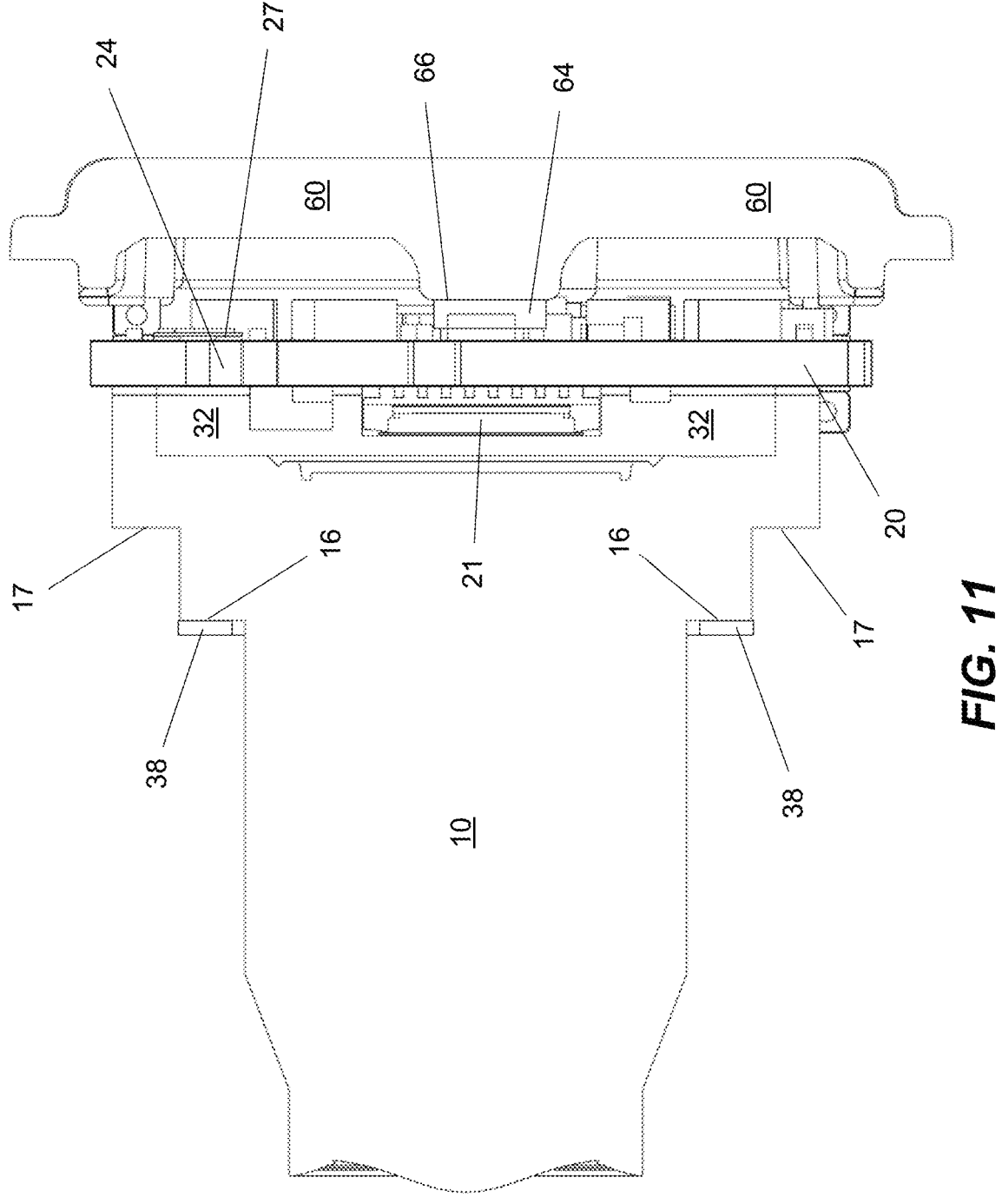
FIG. 11 shows a sectional view of the partially assembled camera of FIGS. 5 and 6.
Figure 12:
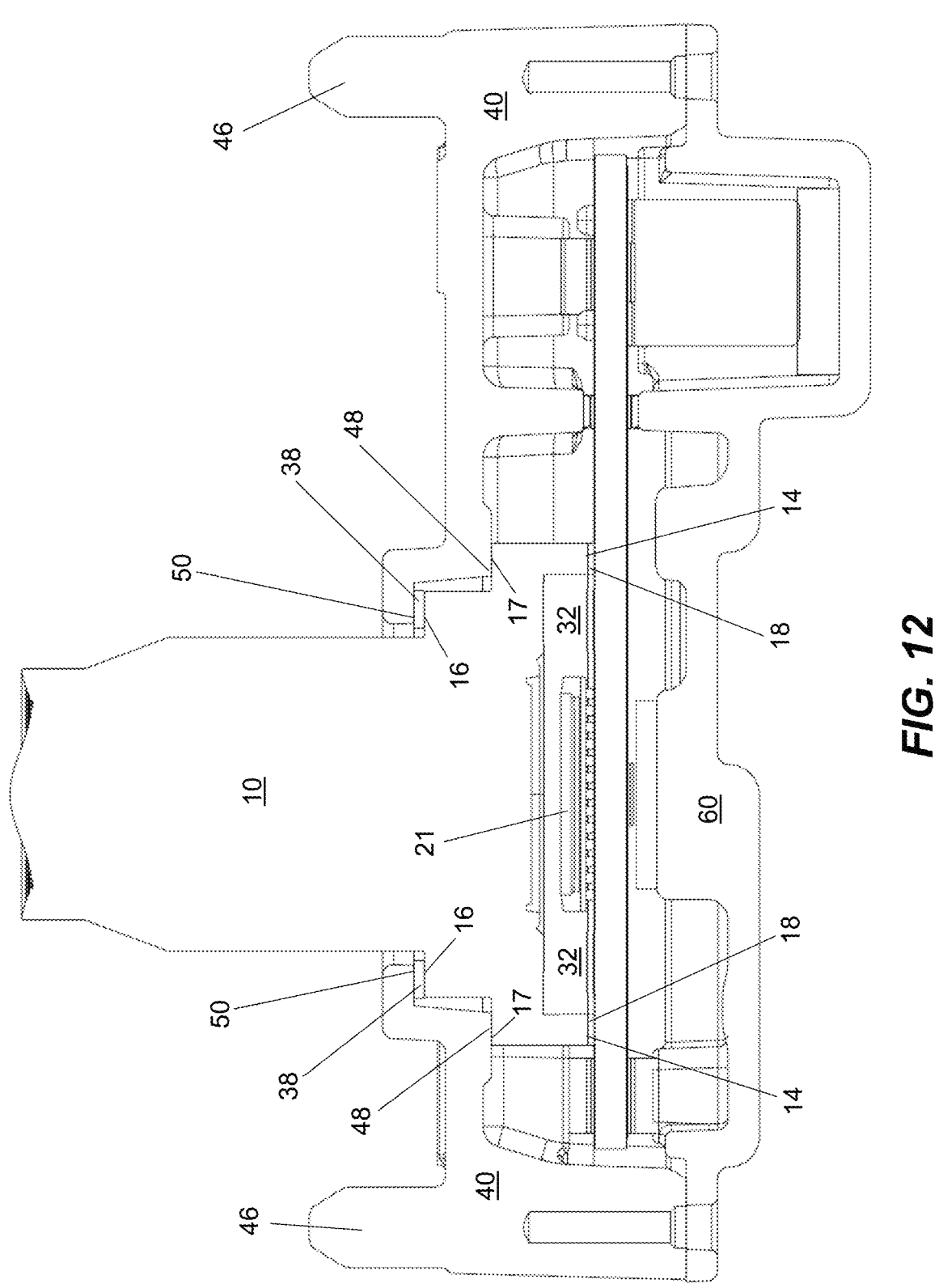
FIG. 12 shows a sectional partial view of the assembled camera of FIGS. 5 and 6.
Figure 13:
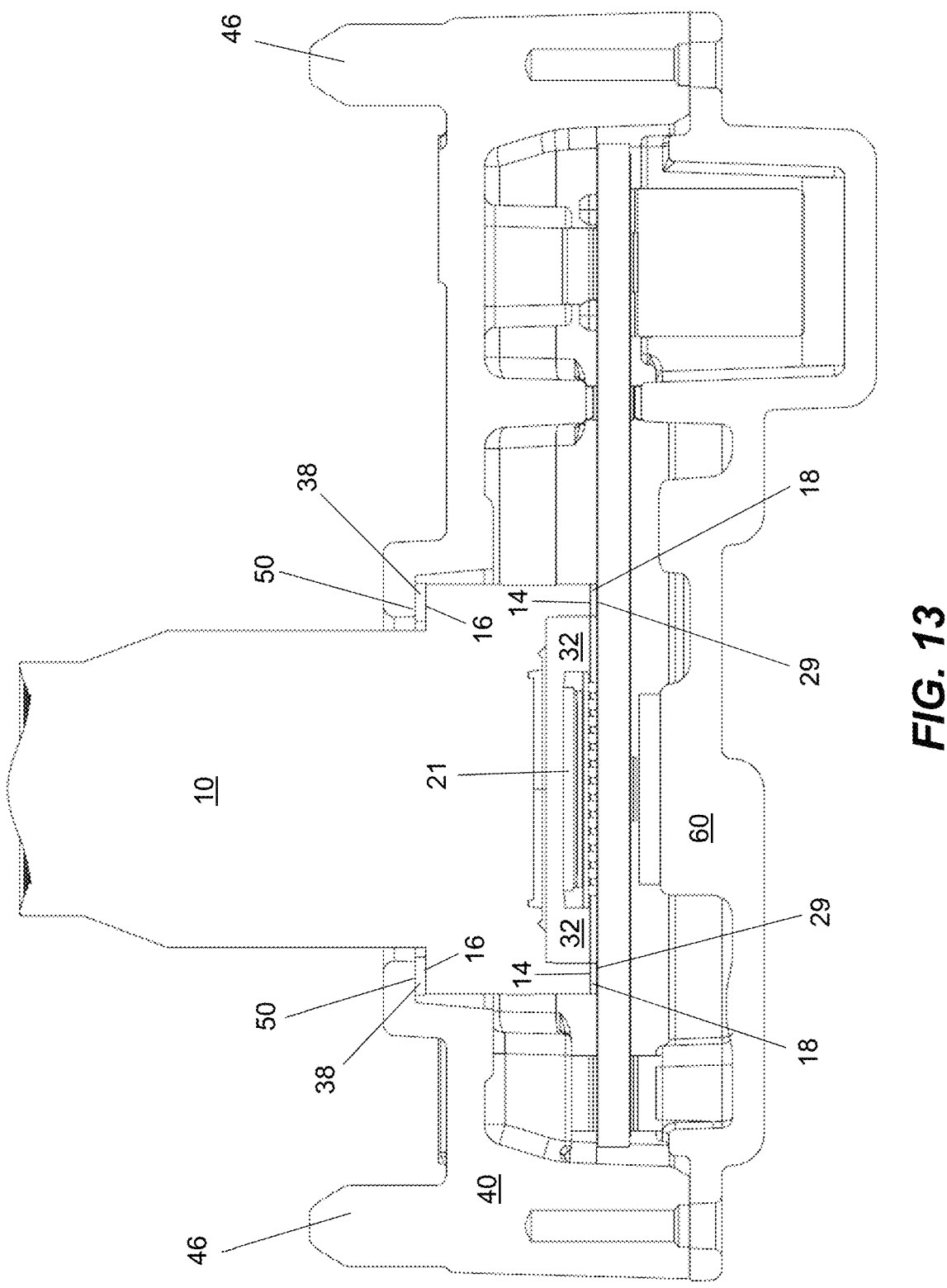
FIG. 13 shows a sectional partial view of a further embodiment of a camera according to the invention.

The contamination proof space 32 which is formed according to the invention between the objective housing 19 and the printed circuit board 20 is shown, e.g., in FIGS. 11, 12, 13. As can be seen there, the camera sensor 21 is enclosed by the contamination proof space 32. As shown in FIGS. 3 and 4, the printed circuit board 20 has an opening 24 through which a pressure equalization between an inside and an outside of the contamination proof space 32 can take place. Mechanical stresses caused by a pressure difference between the inside and the outside of the contamination proof space 32 can thus be inhibited and a bubble formation in a glue during manufacturing can be avoided. In the embodiment shown in FIGS. 3 and 4, a semipermeable cover 27, e.g., made from a Gore-Tex material, is arranged over the opening 24. The semipermeable cover 27 comprises a large number of small openings which enable, as desired, the pressure equalization but prevent the entering of contamination particles. In the embodiment shown in FIGS. 3 and 4, the opening 24 is arranged in a marginal portion of the printed circuit board 20 which, when the objective carrier 30 assembly is mounted in accordance with its intended use, is an upper portion with respect to the direction of gravitation, i.e. with respect to a vertical direction. An accumulation of contamination particles in the neighborhood of the opening 24 and, thus, a clogging of the pores of the semipermeable cover 27 is then less likely.

A connector 26 which can be a molded plastic piece is mounted on the backside of the printed circuit board 20, see FIGS. 3, 4, 7, and 8.

The connector 26 is configured for connecting the printed circuit board with, e.g., a bus system from which the camera can be supplied with energy and through which data interchange can take place.

The mounting of the connector 26 on the backside of the printed circuit board 20 allows a configuration of the connector 26 and of its location on the printed circuit board such that more than one mounting position is possible. In this way, a flexible solution with only minor layout modifications is provided for varying customer's needs. In the present embodiment, three different orientations of the connector 26 are possible. Apart from the orientation as shown in the FIGS., the opening of the connector 26 where a plug can be inserted can be oriented to the side and also to the back, i.e., in a transversal direction to the surface of the printed circuit board 20.

Furthermore, the mounting of the connector 26 on the backside of the printed circuit board 20 leaves a free access, in particular during assembly, for a cleaning of the camera sensor 21 and portions of the printed circuit board 20 which, in the assembled state, are inside the contamination proof space 32. Also, arranging the connector 26 on the backside leaves the front side of the printed circuit board 20 rather flat which also makes a cleaning easier, e.g., by blowing cleaning gas or wiping. Finally, the shown design enables an easy light access, in particular all around the camera objective 10, for a UV snap curing, which is also termed pre-curing, of a glue 18 between the camera objective 10 and the printed circuit board 20. To have a pre-curing which is as uniform as possible is critical to avoid potential tilt or misplacement of the camera objective 10 on the printed circuit board 20 after alignment.

All these design elements contribute to the final goals of achieving maximum cleanliness of the relevant components, in particular the components inside the contamination proof space 32, as well as a high accuracy of the orientation of the camera objective 10 with respect to the camera sensor 21.

According to the invention, the manufacturing of the objective carrier assembly 30 shown in FIG. 2 comprises the steps of mounting the camera sensor 21 on the printed circuit board 20 and mounting the camera objective 10 on the carrier 20 over the at least one camera sensor 21. In the shown embodiment, the camera objective 10 is mounted on the carrier 20 by gluing the objective housing 19 on the printed circuit board 20 using a light curable glue which is shown as a ring 18.

More specifically, in the shown embodiment, the printed circuit board 20 will be populated by all the components, i.e., electric, electronic, and mechanical components, including the ventilation semipermeable membrane 27 over the opening 24.

Before and/or after that a cleaning of the printed circuit board 20 can take place by blowing cleaning gas and/or by wiping the respective surfaces of the printed circuit board 20, in particular of the front side with the camera sensor 21.

Then, the printed circuit board 20 will be registered, i.e., mounted, on a robot-arm which will manipulate the printed circuit board during an alignment step into its correct aligned position with respect to the camera objective 10. A well-defined holding of the printed circuit board 20 by the robot-arm can take place via the recesses 25 which are formed at the edges of the printed circuit board 20, see FIGS. 3, 4, 7, 8.

After that, the glue 18 can be applied on either or both of a ring-like portion 29 on the printed circuit board 20 or a back rim 14 of the objective housing 19.

By operation of the robot-arm, the printed circuit board 20 will then be aligned with respect to the camera objective 10 in such a way that an optical axis of the camera objective 10 is oriented perpendicularly to an active surface of the camera sensor 21. Live measurement data of the camera sensor 10 can be used for finding this orientation between the camera objective 10 and the carrier 20.

Once the intended orientation between the printed circuit board 20 and the camera objective 10 has been achieved, the snap-curing of the glue can take place. In this step, the necessary amount of UV radiation will be applied, e.g., using UV-ring-lamps, to the ring of glue 18. The manufacturing of the objective carrier assembly 30 can then be finalized by fully curing the glue 18 in an oven.

For achieving the required accuracy of the mechanical alignment of the camera objective 10 in relation to the active surface of the camera sensor 21 and, finally for an excellent camera performance, mechanical stresses and strains on the components and in particular on the printed circuit board 20, where the camera sensor 21 is mounted, should be as small as possible.

In the embodiment shown in the figures (see in particular FIGS. 3, 4, 7, 8), elastic spacers 22 are arranged both on the back side as well as on the front side of the printed circuit board 20. The elastic spacers 22 can be made of a foam, but they can also be flexible gaskets or springs. It is also possible to have different types of elastic spacers 22 in one camera.

The elastic spacers 22 provide a bearing for the printed circuit board 20 which prevents large forces to be applied on the printed circuit board 20 from the housing of the camera 100. Thus, the printed circuit board 20 is shielded to a large extent from detrimental mechanical influences. The elastic spacers 22 can further be configured to provide an electrical grounding and EMC protection.

Additionally, or alternatively, it will also be possible to use an electrically conductive glue between the objective camera assembly 30 and the camera housing for providing an electrical connection.

Since the amount of heat which is produced by the electronic components on the printed circuit board and in particular of the camera sensor in operation is not negligible it is also expedient to provide measures for cooling at least portions of the printed circuit board. In the embodiment shown in the figures (see in particular FIGS. 5, 9, and 11) a second housing part 60 which can also be termed a back cover has pedestals 66 which are, in the assembled state of the camera, contacted by a thermal material 64. In operation of the camera, heat will be drained off the printed circuit board 20, and in particular off the camera sensor 21, through the thermal material 64 to the second housing part 60. The material 64 can, e.g., be a thermally conducting paste. In view of the properties of such thermally conducting materials which sometimes tend to degrade over the lifetime of a product, a further advantage of the position of the opening 24 in an upper portion with respect to the nominal vertical direction becomes apparent. The upper portion of the opening 24 also prevents a clogging of the opening through portions of thermally conducting material 64.

According to the third aspect of the invention, the manufacturing of a camera comprises first of all the manufacturing of an objective carrier assembly 30 as described above. Then, the objective carrier assembly 30 will be mounted into a camera housing. In the embodiment described herein, the camera housing comprises a first housing part 40 and a second housing part 60.

According to the fifth aspect of the invention, the manufacturing of a camera comprises mounting the objective carrier assembly 30 over or on the first housing part 40 of a camera housing and then mounting of a second housing part 60 of the camera housing on the first housing part 40.

In the embodiment described here, the objective carrier assembly 30 will be mounted over or on the first housing part 40 using a UV-curable glue 36, 38. More specifically, a first step 16 of the objective housing 19 which has a ring form will be glued using a renewal of glue 38 to a corresponding portion of the first housing 40, see FIGS. 5, 6. Further portions of the printed circuit board 20 will be glued to the first housing part 40 by supplementary pieces of glue 36.

After application of, e.g., the thermal paste 64 described above, and, optionally, a final cleaning step, the second housing part 60 will then be mounted with respect to the first housing part 40. In the shown embodiment this is done with two screws 62 for which mounting holes 68 are provided in the second housing part 60 (see FIGS. 5, 6, and 9). Corresponding threaded holes in which the screws 62 are received are provided in the first housing part 40.

Prior to a snap-curing of the glue 38 and 36, i.e., prior to fixing an orientation of the camera objective carrier 30 with respect to the first housing part 40, an intended orientation has to be found in an alignment step.

In the shown embodiment this alignment can take place as follows. First, the camera objective carrier 30 can be registered, i.e., mounted, on a robot-arm which will manipulate the camera objective carrier 30 during an alignment step into its correct aligned position with respect to the first housing portion 40. This can be done much in the same way as described above for the mounting of the printed circuit board 20 to the camera objective 10, i.e., the printed circuit board 20 can be held by the robot-arm via the recesses 25 at the edges of the printed circuit board 20, see FIGS. 3, 4, 7, 8.

Then, the UV-curable glue 36, 38 can be applied to the respective portions of the printed circuit board 20, to the circular step 16 of the objective housing 19, and the first housing part 40.

By operation of the robot-arm, the objective carrier assembly 30 can then be aligned with respect to the first housing part 40 into a desired position.

Once an intended orientation between the objective carrier assembly 30 and the first housing part 40 has been achieved, the snap-curing of the glue 36, 38 can take place. In this step, the necessary amount of UV radiation will be applied, e.g., using UV-ring-lamps, to the ring of glue 38 and the supplementary portions of glue 36 through openings 42 provided for this purpose in the first housing part 40, see FIG. 6. As described before for the mounting of the camera objective 10 with respect to the printed circuit board 20, the orientation between the objective carrier assembly 30 and the first housing part 40 can then be finalized by fully curing the glue 36, 38 in an oven.

The aligning of the camera objective assembly 30 with respect to the first housing part 40 is done in relation to geometrical alignment features 46 which are formed the first housing part 40 and which are configured as reference markers. In the shown embodiment, geometrical alignment features 46 are realized by two pins 46 having parallel axes, see FIG. 14. The pins 46 are formed with the first housing part 40 in one piece, e.g., in a die-cast process. The pins 46 are also configured for mounting the camera 100 at a place of installation, e.g., at a car and thus provide a reference for the aligning of the camera objective assembly 30 with respect to the car.

Figure 14:
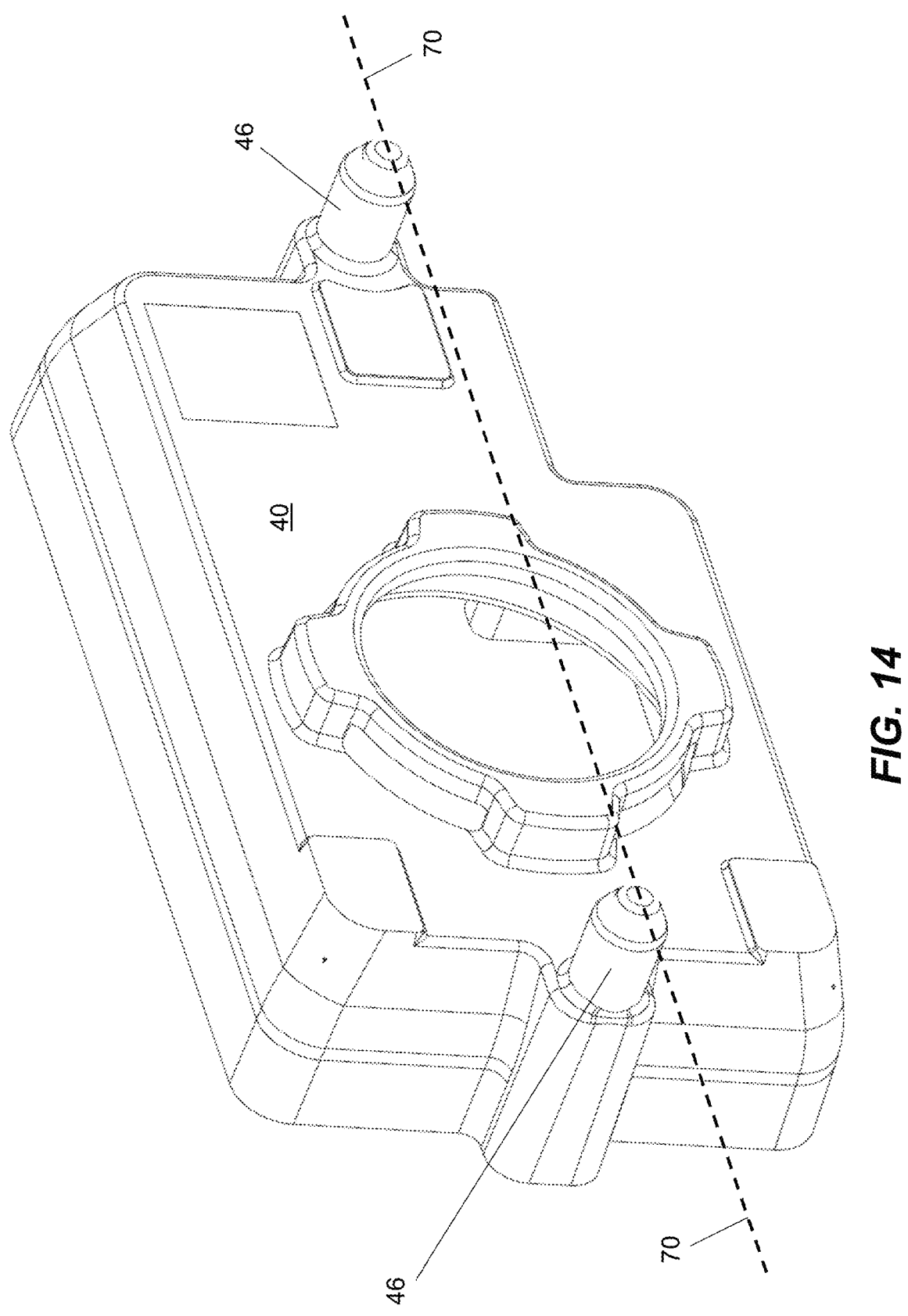
FIG. 14 shows a front perspective view of the first housing part of the camera of FIGS. 5 and 6.
Figure 16:
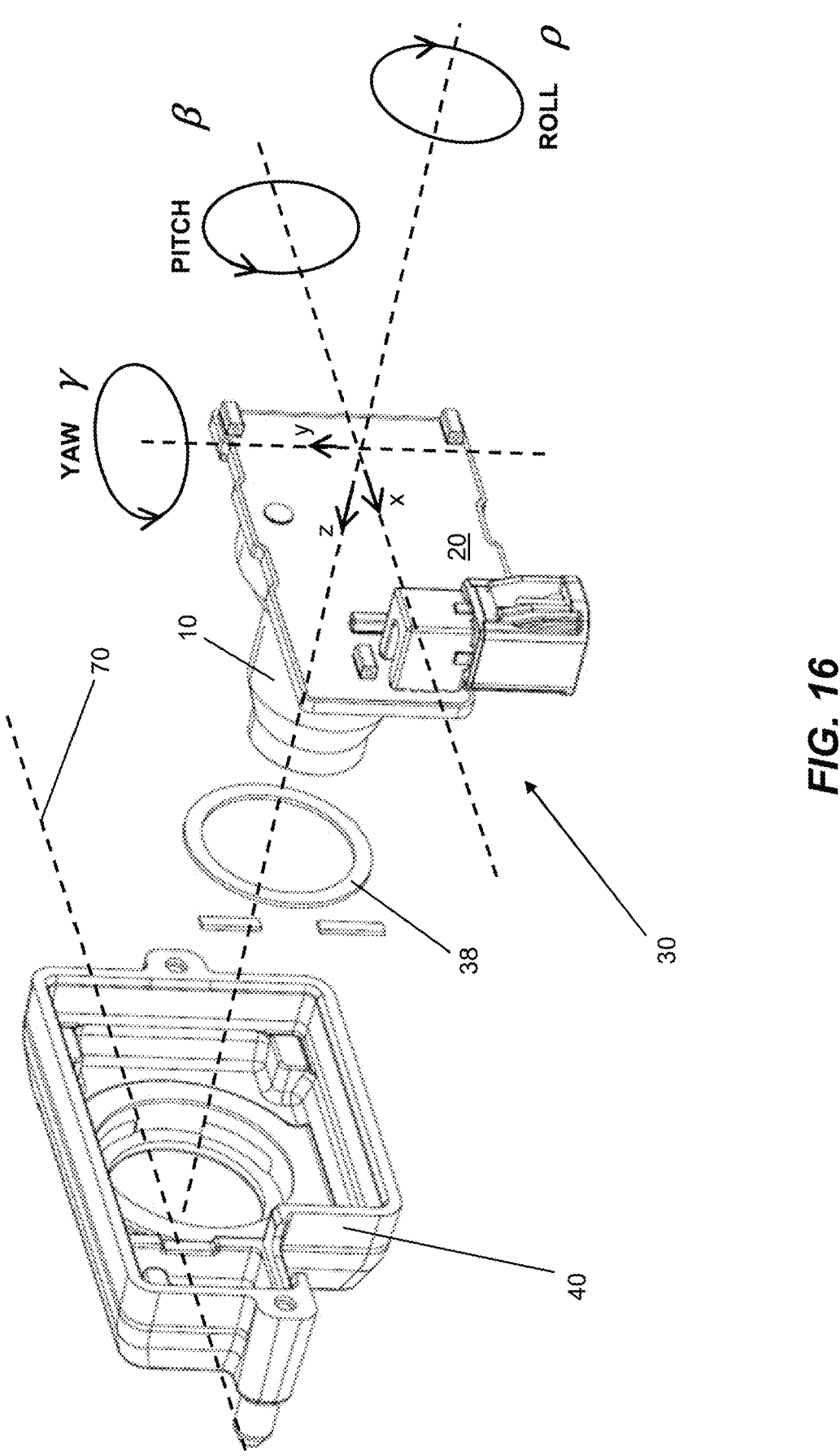
FIG. 16 shows a back perspective exploded view of portions of the camera FIGS. 5 and 6.

Referring now to FIGS. 14 and 16, the pins 46 define a direction of a nominal optical axis z, a nominal transversal direction x, and a nominal vertical direction y. The direction of the nominal optical axis z is defined to be the direction of the parallel axes of the pins 46. The direction of the nominal transversal direction is defined to be the direction of the shortest distance between the axes of the pins 46. It follows therefrom that the nominal transversal direction x is perpendicular to nominal optical axis z. The direction of the nominal vertical direction, finally, is defined to be the direction which is perpendicular to both the nominal optical and the nominal transversal direction.

The directions are termed, in each case, nominal directions because their orientation in space will vary with the orientation of, e.g., a car in space. Only if the frame of a car to which the camera 100 is mounted is horizontal will the nominal vertical direction coincide with a true vertical direction, i.e., the plumb-line direction, and will the nominal transversal direction be a true horizontal direction.

As depicted in FIG. 16, a rotation of the carrier objective assembly 30 around the nominal transversal direction x changes the pitch angle $\beta$, a rotation of the carrier objective assembly 30 around the nominal vertical direction y changes the yaw angle $\gamma$, and a rotation of the carrier objective assembly 30 around the optical axis z changes the roll angle $\rho$.

An aligning of the carrier objective assembly 30 with respect to the first housing part 40 firstly aims at orienting the active surface of the camera sensor 21 perpendicularly to the nominal optical axis z. To the extent to which the optical axis of the camera objective 10 is aligned perpendicularly to the active surface of the camera sensor 21 this is equivalent to orienting the carrier objective assembly 30 in such a way with respect to the first housing part 40 that the optical axis of the camera objective 10 is parallel to the nominal optical axis z, i.e., parallel to the axes of the pins 46.

This aligning of the optical axis of the camera objective 10 into a direction which is parallel to the nominal optical axis z is achieved by suitably changing the yaw angle $\gamma$ and the pitch angle ($\beta$, see FIG. 16.

Secondly, the aligning of the carrier objective assembly 30 with respect to the first housing part 40 aims at orienting a direction of the pixel lines of the camera sensor 21 parallel to the nominal transversal direction x.

The present invention provides solutions to both the alignment of the camera objective carrier 30 with regard to the yaw angle $\gamma$ and the pitch angle $\beta$ as well with regard to the roll angle $\rho$ which will now be described.

In a first option which will be described with respect to FIG. 12, an alignment of the camera objective 10 and, thus, the objective carrier assembly 30 with respect to the pins 46 of the first housing part 40 is achieved by mechanical abutments which are brought into engagement during the mounting process. More specifically, in the embodiment shown in FIG. 12, the first housing part 40 is configured to have an abutment 48 which has the form of a plane circular ring having an axis which is parallel to the nominal optical direction defined by the pins 46. This abutment engages, as shown in FIG. 12, a second circular step 17 of the camera objective housing 19 which has a corresponding form of a plane circular ring, see FIG. 2.

By bringing the second step 17 of the camera objective housing 19 into engagement with the abutment 48 of the first housing part 40 an alignment with respect to the yaw angle γ and the pitch angle β will be achieved.

The accuracy which can be achieved in this alignment will depend on the extent that the axis defined by the plane circular ring constituting the abutment 48 is parallel to the nominal optical axis defined by the pins 46 and to the extent that the axis defined by the second step 17 of the camera objective housing 19 is perpendicular to the active surface of the camera sensor 21.

In this embodiment, the robot holding and manipulating the objective carrier assembly 13 has to bring about the mechanical engagement between the second step 17 of the camera objective housing 19 and abutment 48. After that, the robot can manipulate the objective carrier assembly with regard to the roll angle ρ. For this embodiment, accuracies for the alignment of with respect to the pitch angle β and the yaw angle γ up to +/−0.5 degrees can be achieved. The pitch angle β and the yaw angle γ are normally less critical in the vehicle The accuracy of the alignment with respect to the roll angle ρ will be much better than +/−0.5 degree since it is not mechanically constrained and depends only on process capabilities. How this can be done will be described below.

A second option for which no mechanical abutments are necessary will be described with respect to FIG. 13. As can be seen, the housing 19 of the camera objective 10 in FIG. 13 differs slightly from the embodiment of FIG. 12 to the extent that it does not have the second step 17 which acts as a mechanical abutment. In this embodiment, the objective carrier assembly β can be freely aligned by the robot with respect to each of the pitch angle β, the yaw angle γ, and roll angle ρ.

In the aligning step information on the relative orientation between the objective carrier assembly 30 and the first housing part 40 can be obtained by evaluating live image data from the camera sensor 21 for finding an aligned position of the objective carrier assembly 30 with respect to at least the pitch angle β and the yaw angle γ in relation to the camera housing. The camera sensor 21 can, e.g., be exposed to an image which is in a known orientation with regard to the first housing part 40 and thus the pins 46. The live image data from the camera sensor 21 of the image can be monitored and used for aligning of the objective camera assembly 30 with respect to the pitch angle β and the yaw angle γ. In this embodiment, each of the pitch, yaw, and roll angles will be controlled by the process.

The invention has realized that, to achieve a particularly high alignment accuracy of the roll angle ρ, the individual orientation of the camera sensor 21 in an individual objective carrier assembly 30 has to be considered.

More specifically, the aligning step can comprise aligning an individual objective carrier assembly specifically with respect to the first housing part 30 based on an orientation of the camera sensor 21 with respect to the carrier 20 in the individual objective carrier assembly and based on a predefined orientation of the camera sensor 21 with respect to the first housing part 40. I.e., the objective carrier assembly 30 can be mounted over or on the first housing part 40 in an orientation which has been individually and specifically determined for each individual camera. This will be described with respect to the FIGS. 15 and 16.

First, the orientation of the camera sensor 21, more specifically, the orientation of the pixel lines in relation to the carrier 20 with respect to a roll angle ρ, will be measured. The measurement result can then be used in the aligning step so as to bring the camera sensor 21 in a predefined orientation to the first housing part 40.

For this measurement, each individual carrier 20 has two positioning markers 74 which define a reference direction for the measurement of the orientation of the pixel lines. The reference direction is defined by a line connecting these two positioning markers 74, which can also be termed fiducial markers.

The active area of a camera sensor 21 is always at some tilt with respect to the positioning markers 74 of the printed circuit board 20 and even to its own packaging which is critical for overall roll precision on the camera level.

Figure 15:
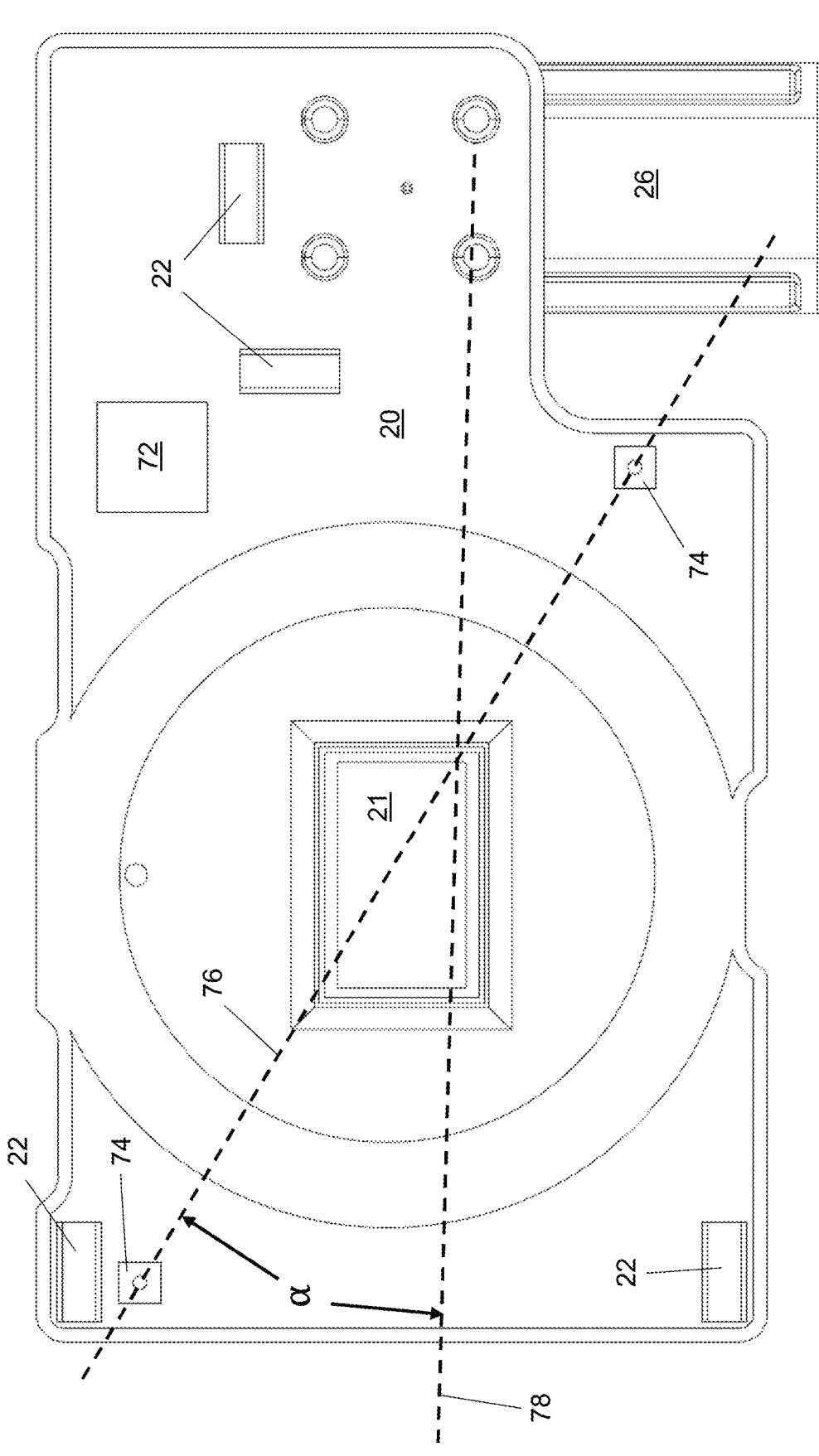
FIG. 15 shows a front view of the carrier of the camera of FIGS. 5 and 6.

The measurement, which can be carried out using, e.g., a microscope or another suitable optical measurement device, will yield a specific angle α between a measured direction 78 of the pixel lines and the reference direction as defined by the positioning markers 74 depicted in FIG. 15. The individual value of a will be saved for each individual objective carrier assembly 30 in a computer system, e.g., in a Factory Information System (FIS). This measurement can be done prior to the mounting of the camera objective 10 on the printed circuit board 20.

Each printed circuit board 20 has an individual label or tag 72 with a unique part number which contains a reference to the specific data of this individual objective carrier assembly which are stored in a computer system, i.e., in particular to the measured value of a for this specific printed circuit board. The tag 72 can e.g., comprise a one dimensional or two-dimensional barcode.

In the manufacturing process of the camera, the value of a will then be retrieved using based on the tag 72 and the robot operating the objective carrier assembly 30 can then be controlled such that the direction of the pixel lines 78 of respective individual objective carrier assembly 30 will be aligned parallel to the nominal transversal direction x, see FIG. 16.

Once the intended orientation of the objective carrier assembly 30 with respect to the first housing part 40 has been achieved, it can be fixed by snap-curing of the clue 38, 36 and finalized in a curing oven as described above.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

LIST OF REFERENCE NUMBERS

10 camera objective
11 first lens 12 second lens
14 back rim of camera objective housing 19
16 first ring step of camera objective housing 19
17 second ring step of camera objective housing 19, abutment
18 ring of glue or adhesive
19 housing of camera objective 10
20 carrier, printed circuit board, PCB
21 camera sensor
22 elastic spacer, conductive elastic spacer
24 opening in carrier
25 holding regions recesses in carrier 20 for grabbing carrier 20
26 connector
27 cover over or on hole 24, semipermeable membrane
29 ring, where glue 18 is to be applied
30 objective carrier assembly according to the invention
32 contamination-proof space
36 supplementary piece of glue or adhesive
38 ring of glue or adhesive
40 first part of camera housing, front cover
42 openings in front cover 40 for illumination of glue 36, 38
44 pedestals in front cover 40 to be engaging elastic spacers 22
46 pin of front cover 40, reference feature to car environment geometrical alignment feature
48 abutment in front cover 40 to be engaging abutment 17
50 surface ring of first part of camera housing 40 to be engaging ring of glue
60 second part of camera housing, back cover
62 screws
64 thermal material, thermal pad, thermal paste
65 pedestals in back cover 60 to be contacted by elastic spacers 22
66 pedestals in back cover 60 to be contacted by thermal material 64
68 mounting holes for screws 62 in back cover 60
70 first reference line, nominal transversal direction
72 label or PCB-label, memory tag, RFID-tag
74 positioning marker, PCB-positioning marker
76 second reference line
78 third reference line, parallel to pixel lines in camera sensor 21
100 camera according to the invention
x x-axis, nominal transversal direction
y y-axis, nominal vertical direction
z z-axis, nominal direction of optical axis
$\alpha$ angle between second reference line 76 and third reference line 78
$\beta$ pitch angle (rotation about the nominal transversal direction)
$\gamma$ yaw angle (rotation about the nominal vertical direction)
$\rho$ roll angle (rotation about the nominal direction of optical axis)

The invention claimed is:

1. A camera comprising:
an objective carrier assembly including a carrier on which a camera sensor and a camera objective are mounted, the carrier including a front side and a back side, wherein elastic spacers are arranged on each of the front side and the back side of the carrier; and
a camera housing configured to at least partially enclose the objective carrier assembly, wherein the camera housing includes:
a first housing part on which the objective carrier assembly is mounted, and a second housing part that is mounted on the first housing part;
wherein the elastic spacers are configured to mechanically stabilize the objective carrier assembly within the camera housing by engaging both the first housing part and the second housing part,
wherein the elastic spacers are block-shaped, and
wherein the elastic spacers are made from at least one of: a foam or a flexible elastomeric material.

2. The camera according to claim 1 wherein the elastic spacers are configured to provide at least one of an electrical shielding of the objective carrier assembly, an electrical contact to the objective carrier assembly, or an electrical ground contact to the objective carrier assembly.

3. The camera according to claim 1 wherein at least one of the first housing part and the second housing part is at least partly made of metal.

4. The camera according to claim 1 further comprising portions of thermally conductive material that are arranged between portions of the carrier of the objective carrier assembly and portions of at least one of the first housing part and the second housing part.

5. The camera according to claim 1 wherein the first housing part is configured to mount the camera at a place of installation.

6. The camera according to claim 1 wherein the first housing part has geometrical alignment features that are configured as reference markers for aligning of the objective carrier assembly in relation to the first housing part.

7. The camera according to claim 6 wherein the geometrical alignment features are configured to mount the camera at a place of installation.

8. The camera according to claim 1 wherein the objective carrier assembly includes at least one mechanical abutment that engages a mechanical abutment provided at the first housing part for purposes of alignment of the objective carrier assembly in relation to the first housing part with respect to at least one of a pitch angle and a yaw angle.

9. The camera according to claim 8 wherein the at least one mechanical abutment of the objective carrier assembly is provided at a housing of the camera objective.

10. The camera according to claim 1 wherein the first housing part has a plurality of openings that are configured to enable a snap-curing of a light curable glue.

11. A method of manufacturing a camera, the method comprising:
providing an objective carrier assembly including a carrier on which at least one camera sensor and a camera objective are mounted, wherein elastic spacers are arranged on each of a front side and a back side of the carrier;
mounting the objective carrier assembly on a first housing part of a camera housing; and
mounting of a second housing part of the camera housing on the first housing part,
wherein the elastic spacers are configured to mechanically stabilize the objective carrier assembly within the camera housing,
wherein the elastic spacers are block-shaped, and
wherein the elastic spacers are made from at least one of: a foam or a flexible elastomeric material.

12. The method according to claim 11 wherein mounting the objective carrier assembly includes gluing at least a housing of the camera objective to the first housing part.

13. The method according to claim 11 wherein mounting the objective carrier assembly includes aligning the objective carrier assembly with respect to the first housing part.

14. The method according to claim 13 further comprising, after the aligning, fixing an orientation of the objective carrier assembly with respect to the first housing part by snap-curing of a light curable glue.

\* \* \* \* \*